US008033267B2

(12) United States Patent
Nakagawa et al.

(10) Patent No.: US 8,033,267 B2
(45) Date of Patent: Oct. 11, 2011

(54) CONTROL APPARATUS FOR AN ENGINE

(75) Inventors: Shinji Nakagawa, Hitachinaka (JP);
Kazuhiko Kanetoshi, Hitachinaka (JP);
Kozo Katogi, Hitachi (JP); Takanobu Ichihara, Naka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 12/339,401

(22) Filed: Dec. 19, 2008

(65) Prior Publication Data
US 2009/0159042 A1   Jun. 25, 2009

(30) Foreign Application Priority Data
Dec. 25, 2007  (JP) .................. 2007-331313

(51) Int. Cl.
*F02P 5/10*    (2006.01)

(52) U.S. Cl. ............... 123/406.22; 123/406.53
(58) Field of Classification Search ........... 123/334, 123/406.22, 406.41, 406.53; 701/102, 113
See application file for complete search history.

(56) References Cited

U.S. PATENT DOCUMENTS

| 4,466,405 | A | * | 8/1984 | Hattori et al. | 123/406.42 |
| 5,701,868 | A | * | 12/1997 | Tomisawa | 123/406.53 |
| 5,950,419 | A | * | 9/1999 | Nishimura et al. | 60/274 |
| 6,491,024 | B1 | * | 12/2002 | Connolly et al. | 123/406.19 |
| 6,536,410 | B1 | | 3/2003 | Nehse | |
| 2002/0026925 | A1 | * | 3/2002 | Yuya | 123/406.53 |
| 2003/0116131 | A1 | * | 6/2003 | Majima et al. | 123/406.53 |

FOREIGN PATENT DOCUMENTS

| DE | 199 18 664 A1 | | 11/2000 |
| JP | 2-64252 A | | 3/1990 |
| JP | 8-122099 A | | 5/1996 |
| JP | 9-100741 A | | 4/1997 |
| JP | 10-110638 | | 4/1998 |
| JP | 2001-153014 | | 6/2001 |
| JP | 2002295287 A | * | 10/2002 |
| JP | 2007 001425 | | 1/2007 |

OTHER PUBLICATIONS

European Search Report dated Jul. 27, 2010 (5 pages).
Japanese Search Report dated May 11, 2010 (2 pages).

* cited by examiner

*Primary Examiner* — Mahmoud Gimie
(74) *Attorney, Agent, or Firm* — Crowell & Moring LLP

(57) ABSTRACT

A control apparatus for an engine including a unit for retarding an ignition timing from an MBT by a predetermined value or more during cranking at engine starting or during a period from a first combustion up to an idling engine speed.

13 Claims, 22 Drawing Sheets

FIG. 18
<COMBUSTION CHAMBER INTERNAL TEMPERATURE ESTIMATE VALUE OPERATION SECTION>
※PERFORM PROCESSING OF THIS OPERATION SECTION FOR EACH COMBUSTION
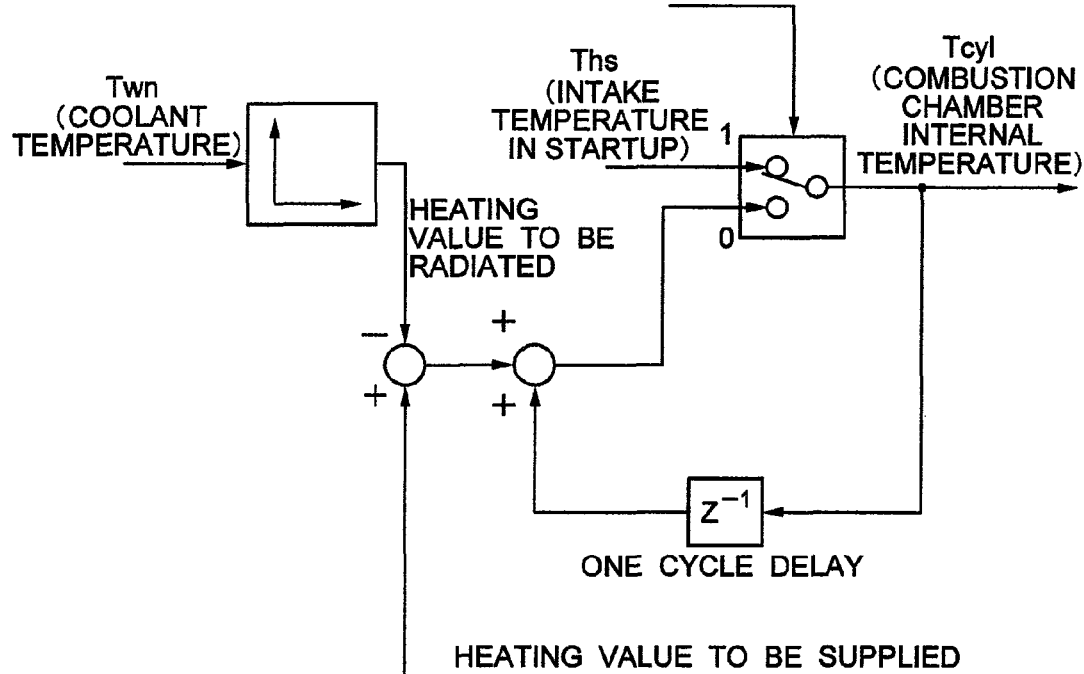
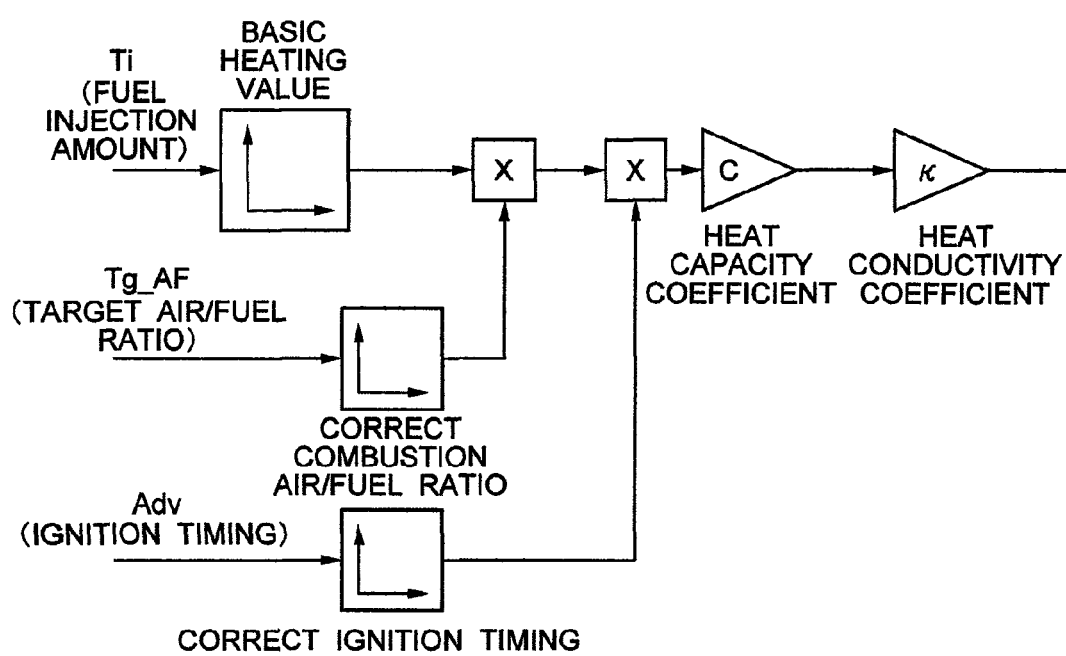

CONTROL APPARATUS FOR AN ENGINE

BACKGROUND OF THE INVENTION

The present invention relates to a control apparatus for an engine, and particularly to, a control apparatus for attaining reduction in exhaust emissions in startup of the engine.

In recent years, associated with tightening of regulations on exhaust emissions from vehicle engines, further reduction in engine exhaust emissions is being demanded in all countries of the world such as the United States, Europe and Japan.

Conventionally, it is known that the retarding of the ignition timing is available to reduce exhaust amount of hydrocarbons before activation of catalysts. Meanwhile, it is also known that when the retarding is performed, combustion condition (operating condition of an engine) is unstable.

Japanese Patent Application Publication JP-A-8-122099 discloses a control apparatus that compares a predetermined threshold to a deviation amount between an average angular acceleration in all cylinders and an average angular acceleration in each of the cylinders, and that corrects an ignition timing in an idle operation.

The a control apparatus of JP-A-8-12209 is based on the assumption that the engine is in an idle operation state. Further, since the ignition timing is corrected based on the results of a statistical processing (average calculation), a correction speed tends to get slow. Accordingly, as described above, it is difficult to apply the technique of JP-A-8-12209 to an extremely early stage in startup of engine from a first combustion to a start of the idle operation and, therefore, the exhaust emissions are considered not to be reduced yet.

In addition to the above, Japanese Patent Application Publications. JP-A-9-100741 and JP-A-2-064252 also disclose similar control apparatus. In the same manner as in the above, any of the inventions are based on the assumption that the engine is in an idle operation state. Further, since the ignition timing is corrected based on the results of a statistical processing (average calculation), the above-described problem is considered not to be solved yet.

SUMMARY OF THE INVENTION

Improvement in the exhaust emission control performance of catalysts and high accuracy of the catalyst control are being promoted and the amount of exhaust emission in engine startup is predominant as to the exhaust emissions from the operating engine. Particularly, in order to adapt to the latest and future exhaust emission regulations, there is an important issue that the exhaust emissions are reduced in an extremely early stage in engine startup from a first combustion to a start of the idle operation In view of the foregoing, an object of the present invention is to provide a control apparatus for realizing reduction in the exhaust emissions in an extremely early stage in engine startup from the first combustion of engine to a start of the idle operation.

Other objects, features and advantages of the invention will become apparent from the following description of the embodiments of the invention taken in conjunction with the accompanying drawings.

BRIEF DESCRIPTION OF THE DRAWINGS

FIG. 18 is a block diagram showing a combustion chamber internal temperature estimate value calculating section according to the third embodiment of the invention.

DESCRIPTION OF THE EMBODIMENTS

Figure 1:
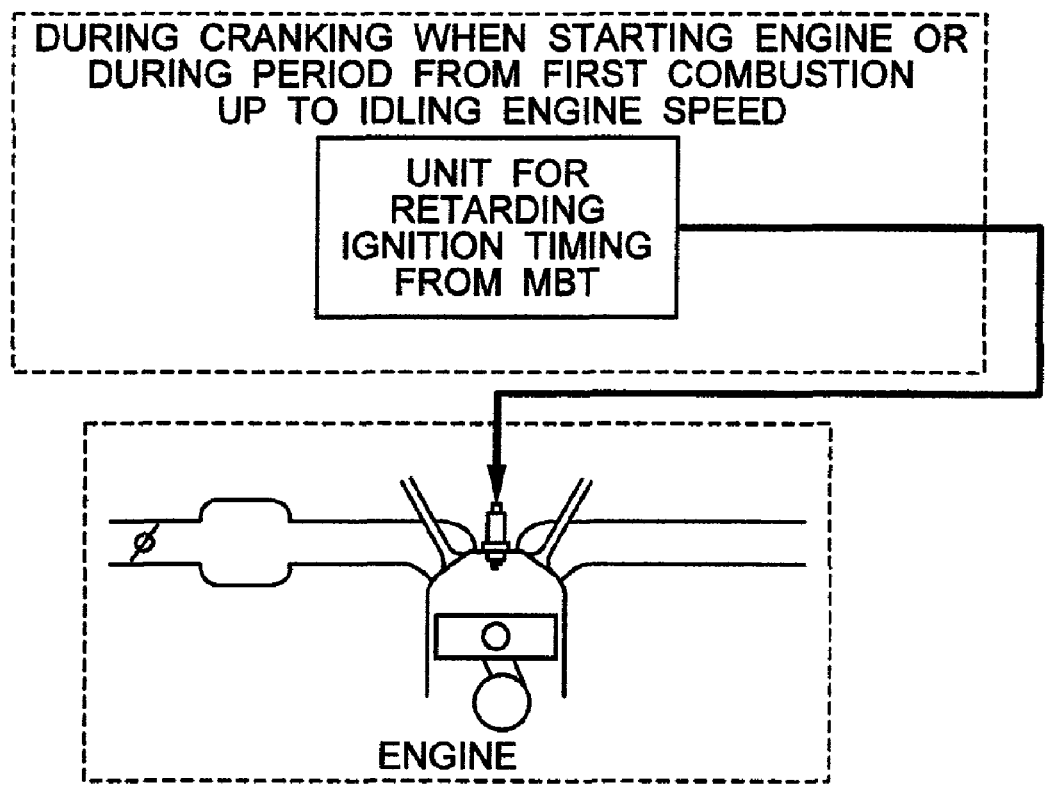
FIG. 1 is a control apparatus for an engine according to one aspect of the invention.

According to one aspect of the invention, as shown in FIG. 1, there is provided a control apparatus for an engine, comprising:

during cranking when starting an engine or during a period from a first combustion to reaching to an idling engine speed, a unit for retarding an ignition timing from an MBT by a predetermined value or more.

That is, the control apparatus comprises at least a unit for retarding the ignition timing from the MBT (Minimum advance for Best Torque) to reduce exhaust emissions in an extremely early stage in startup from a time point of the first combustion up to a start of an idling of engine.

Figure 2:
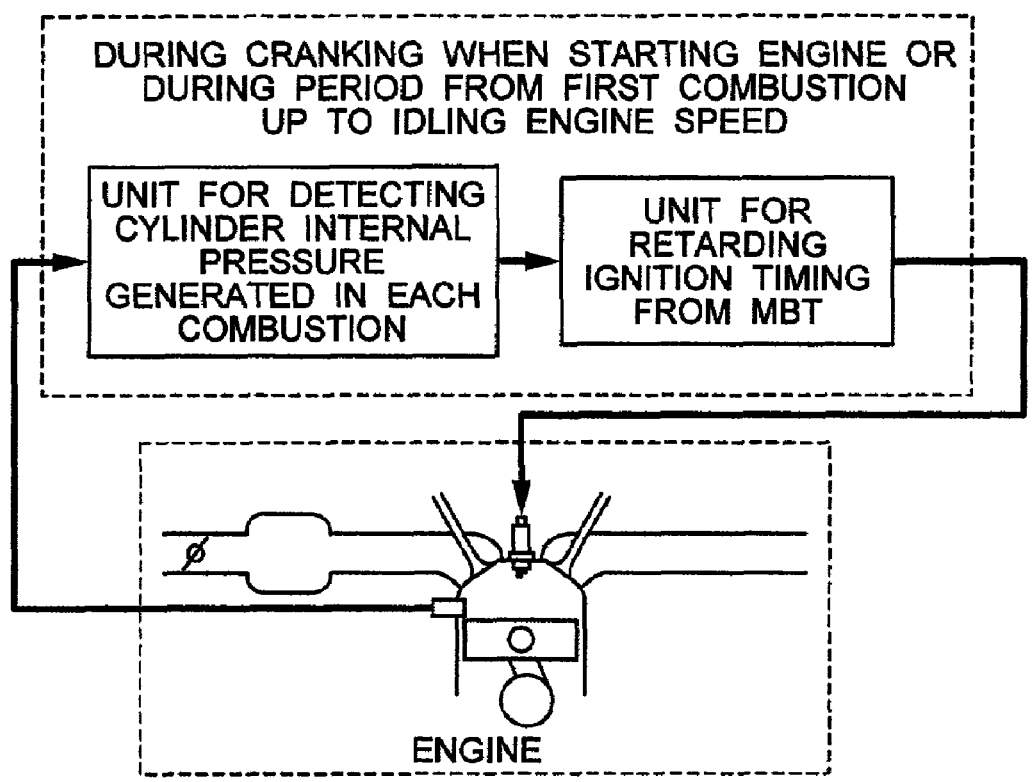
FIG. 2 is the control apparatus for an engine according to another aspect of the invention.

According to another aspect of the invention, as shown in FIG. 2, there is provided the control apparatus, further comprising:

during cranking when starting the engine or during a period from the first combustion to reaching to the idling engine speed, a unit for retarding the ignition timing by the predetermined value or more from the MBT;

a unit for directly or indirectly detecting a cylinder internal pressure generated in each combustion; and a unit for correcting the retard amount based on the cylinder internal pressure.

As described above, when the retarding is performed, combustion in cylinders (operating state of the engine) becomes unstable. Therefore, for always performing the retarding up to the stability limit of engine, a function for detecting the stability limit on board and for optimizing the retard amount is required. To cope with the above, the control apparatus comprises a unit for directly or indirectly detecting a cylinder internal pressure (combustion pressure) generated in each combustion, and for correcting (optimizing) the retard amount for each combustion in order to detect the stability limit to optimize the retard amount also during cranking when starting an engine or during a period from the first combustion up to the idling engine speed.

Figure 3:
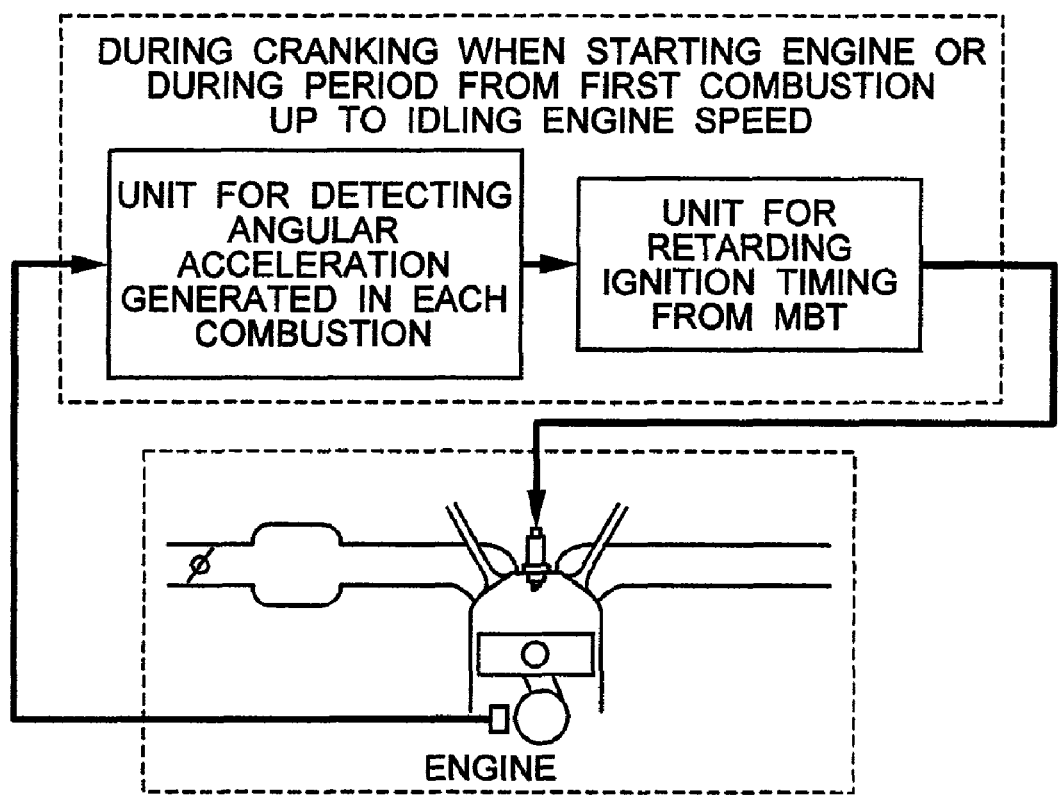
FIG. 3 is the control apparatus for an engine according to still another aspect of the invention.

According to still another aspect of the invention, as shown in FIG. 3, there is provided the control apparatus, further comprising:

during cranking when starting the engine or during a period from the first combustion up to the idling engine speed, a unit for retarding the ignition timing by the predetermined value or more from the MBT;

a unit for detecting an angular acceleration of a crank angle for each combustion; and a unit for correcting the retard amount based on the angular acceleration.

As described above, when the retarding is performed, the combustion in cylinders (driving state of the engine) becomes unstable. Therefore, for always performing the retarding up to the stability limit, a function for detecting the stability limit on board and for optimizing the retard amount is required. To cope with the above, the control apparatus comprises a unit for directly or indirectly detecting an angular acceleration of the engine generated in each combustion, and for correcting (optimizing) the retard amount for each combustion in order to detect the stability limit to optimize the retard amount also during cranking when starting an engine or during a period from the first combustion up to the idling engine speed. It is used the fact that from laws of motion, a correlation is present between the combustion pressure and the angular acceleration.

Figure 4:
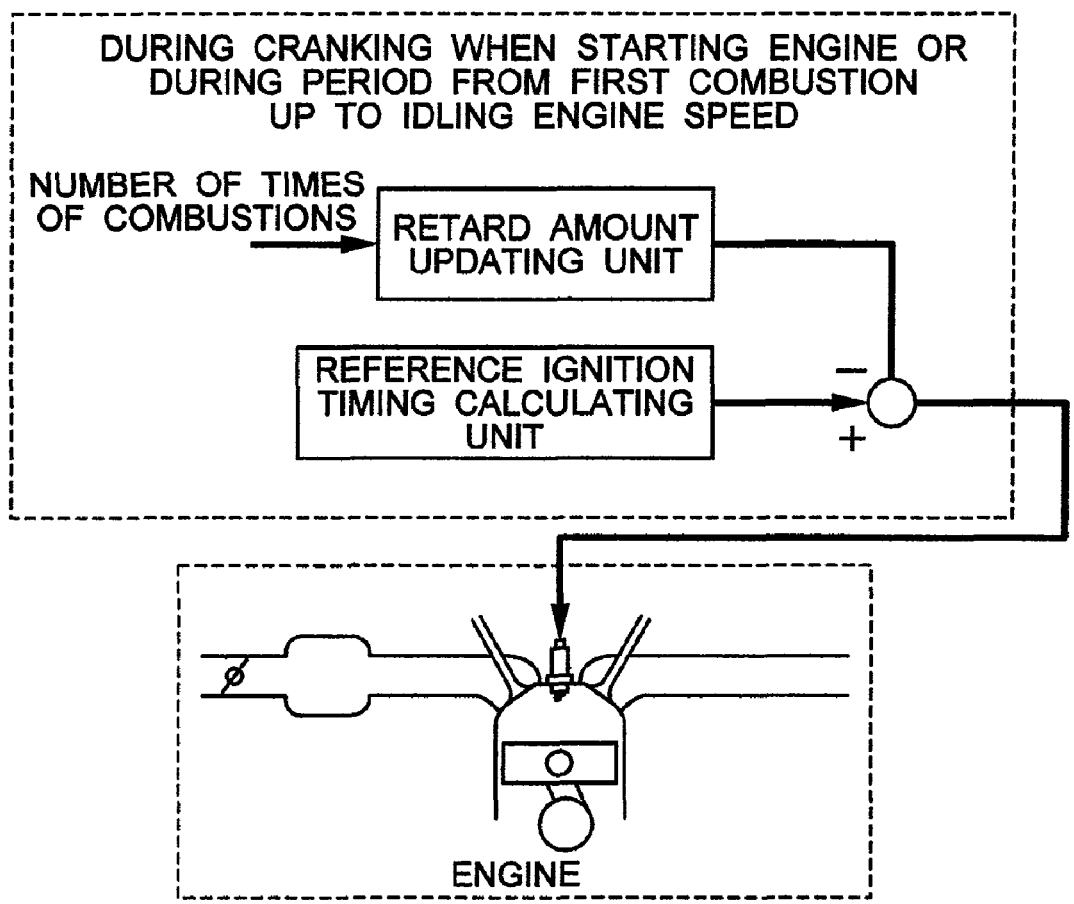
FIG. 4 is the control apparatus for an engine according to still another aspect of the invention.

According to still another aspect of the invention, as shown in FIG. 4, there is provided the control apparatus, further comprising:

a unit for calculating a reference ignition timing; and a unit for updating the retard amount of the ignition timing according to the increase of the frequency of combustions.

For example, a reference ignition timing is set to a value near the MBT and then, the retard amount is gradually increased according to the increase of the accumulated number of times of combustion strokes as times goes by. Specifically, the retard amount is relatively reduced from the first combustion up to one cycle in consideration of a start performance of the engine. Then, as the engine speed more increases to some extent and the stability of engine running is more established after engine start, the retard amount is more increased.

Figure 5:
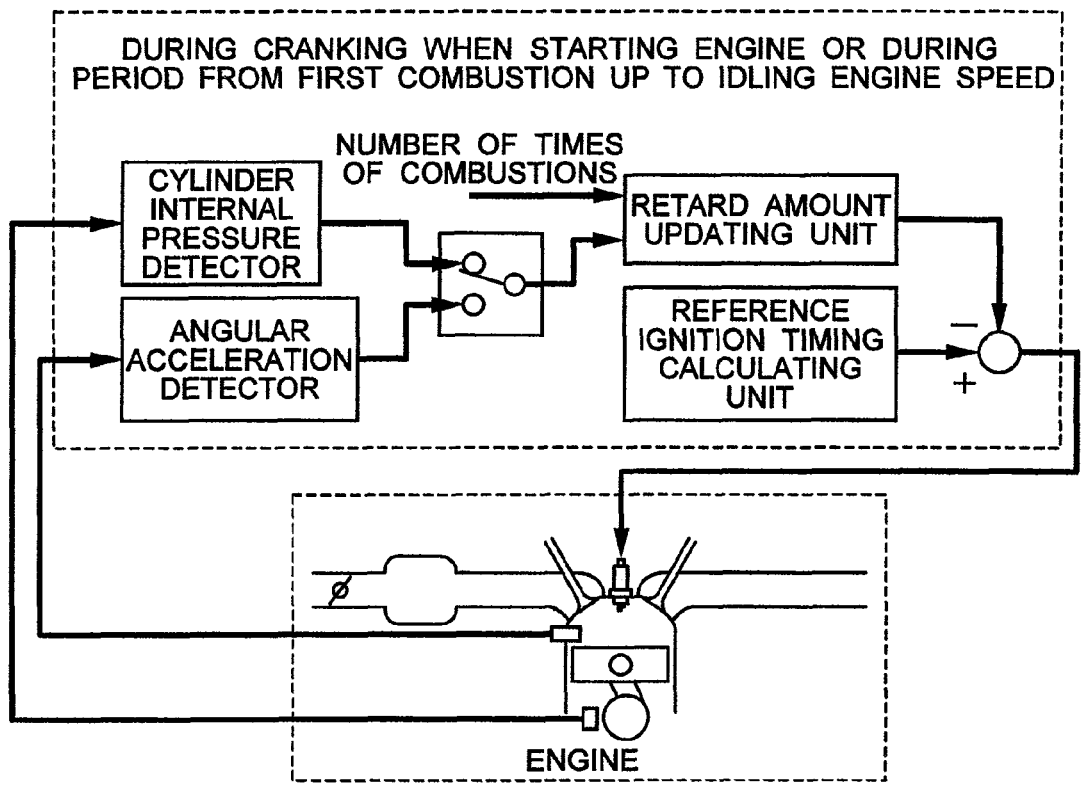
FIG. 5 is the control apparatus for an engine according to still another aspect of the invention.

According to still another aspect of the invention, as shown in FIG. 5, there is provided the control apparatus, further comprising:

a unit for calculating the reference ignition timing;

a unit for updating the retard amount of the ignition timing according to the increase of the number of times of combustions; and a unit for calculating the retard amount based on a combustion pressure or an angular acceleration.

As described above, for example, a reference ignition timing is set to a value near the MBT and then the retard amount is gradually increased according to the increase of the accumulated number of times of combustion strokes. At the same time, the combustion pressure or angular acceleration of the engine generated in each combustion is detected and the next retard amount is determined based on the above value.

For example, when the combustion pressure or the angular acceleration relatively increases, it is determined that there is a margin in the combustion and, therefore, the next retard amount is relatively increased. When the combustion pressure or the angular acceleration relatively decreases, it is determined that there is no margin in the combustion and, therefore, it is considered that the next retard amount is relatively reduced, or the ignition timing is returned to the advance side.

Figure 6:
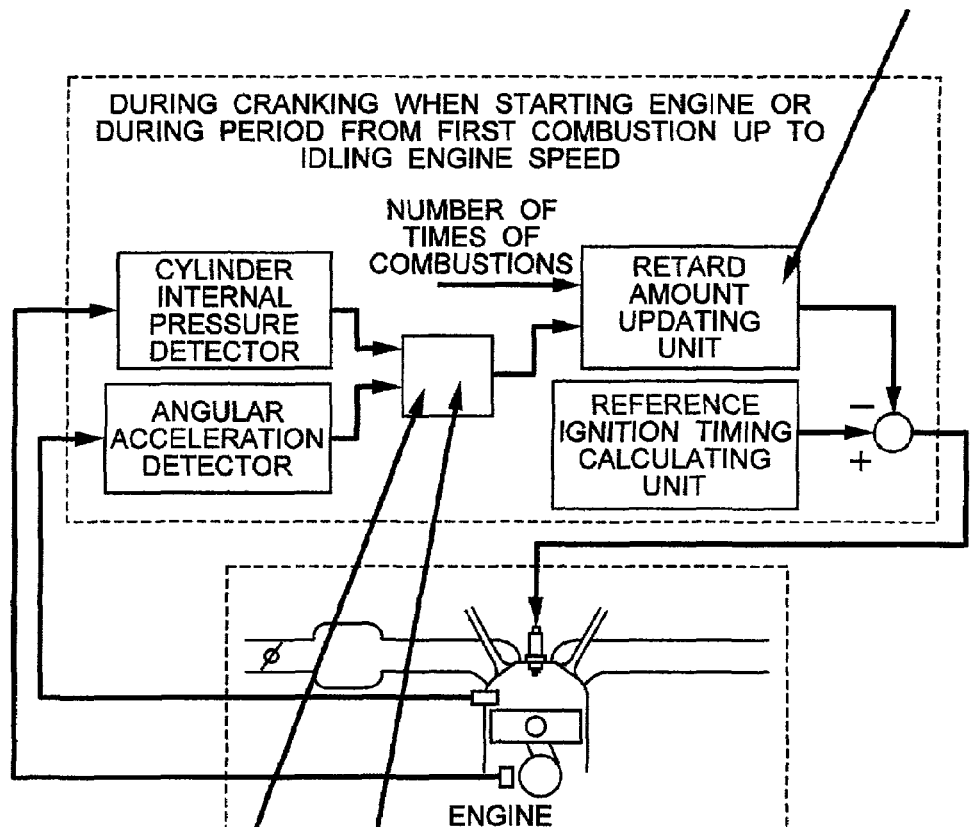
FIG. 6 is the control apparatus for an engine according to still another aspect of the invention.

According to still another aspect of the invention, as shown in FIG. 6, there is provided the control apparatus, further comprising:

a unit for calculating the reference ignition timing;

a unit for updating the retard amount of the ignition timing according to the increase of the number of times of combustions; and a unit for stopping the retarding or returning the ignition timing to the reference value when the combustion pressure is equal to or smaller than a predetermined value A, or the angular acceleration is equal to or smaller than a predetermined value B.

That is, as described above, when the combustion pressure or the angular acceleration is smaller than a predetermined value, the combustion is determined to be unstable and, therefore, the next retard amount is set to be the same as this retard amount. Alternatively, the next retard amount is returned to the reference value to definitely secure the stability.

According to still another aspect of the invention, as shown in FIG. 6, there is provided the control apparatus, further comprising:

a unit for determining the predetermined value A or B based on the frequency of combustions from at least one of the first combustion, the engine speed, and a charging efficiency of intake air in the combustion chamber (cylinder inside).

That is, the combustion pressure (predetermined value A) or the angular acceleration (predetermined value B) in which the combustion is determined to be unstable is determined based on the frequency of combustions from at least one of the first combustion, the engine speed, and the charging efficiency of intake air in the combustion chamber (cylinder inside).

The reason that the combustion pressure or angular acceleration is determined based on the number of times of combustions from the first combustion is as described above. That is, at the first combustion or in a period from the first combustion up to one cycle of engine, a level of the stability limit is relatively set to a stability side and the retardable amount is set to be reduced in consideration of the startablity of the engine. As the engine speed more increases to some extent and the stability of engine running is more established, a level of the stability limit is relatively set to an unstable side and the retardable amount is more increased.

The reason that the combustion pressure or angular acceleration is determined based on the engine speed is also pursuant to the above-described. As described later, in the case of using the angular acceleration, as the engine speed more increases, an effect of inertia force more increases and the detection S/N ratio (sensitivity) of combustion state is more reduced. Therefore, the predetermined value B is corrected based on the engine speed.

The reason that the combustion pressure or angular acceleration is determined based on the charging efficiency is as described below. That is, since the generated combustion pressure (angular acceleration) varies due to the charging efficiency, the stability limit equivalent value, the predetermined value A, and the predetermined value B are determined in consideration of the charging efficiency.

According to still another aspect of the invention, as shown in FIG. 6, there is provided the control apparatus, further comprising:

a unit for determining the updated retard amount based on the frequency of combustions from at least one of the first combustion, the engine speed, and the charging efficiency of air in the combustion chamber (cylinder inside).

In the above-described embodiment, the stability limit equivalent value is determined based on the frequency of combustions from the first combustion or/and an engine speed or/and the charging efficiency of air in the combustion chamber (cylinder inside). In the present embodiment, the retard amount may be determined based on the charging efficiency.

Figure 7:
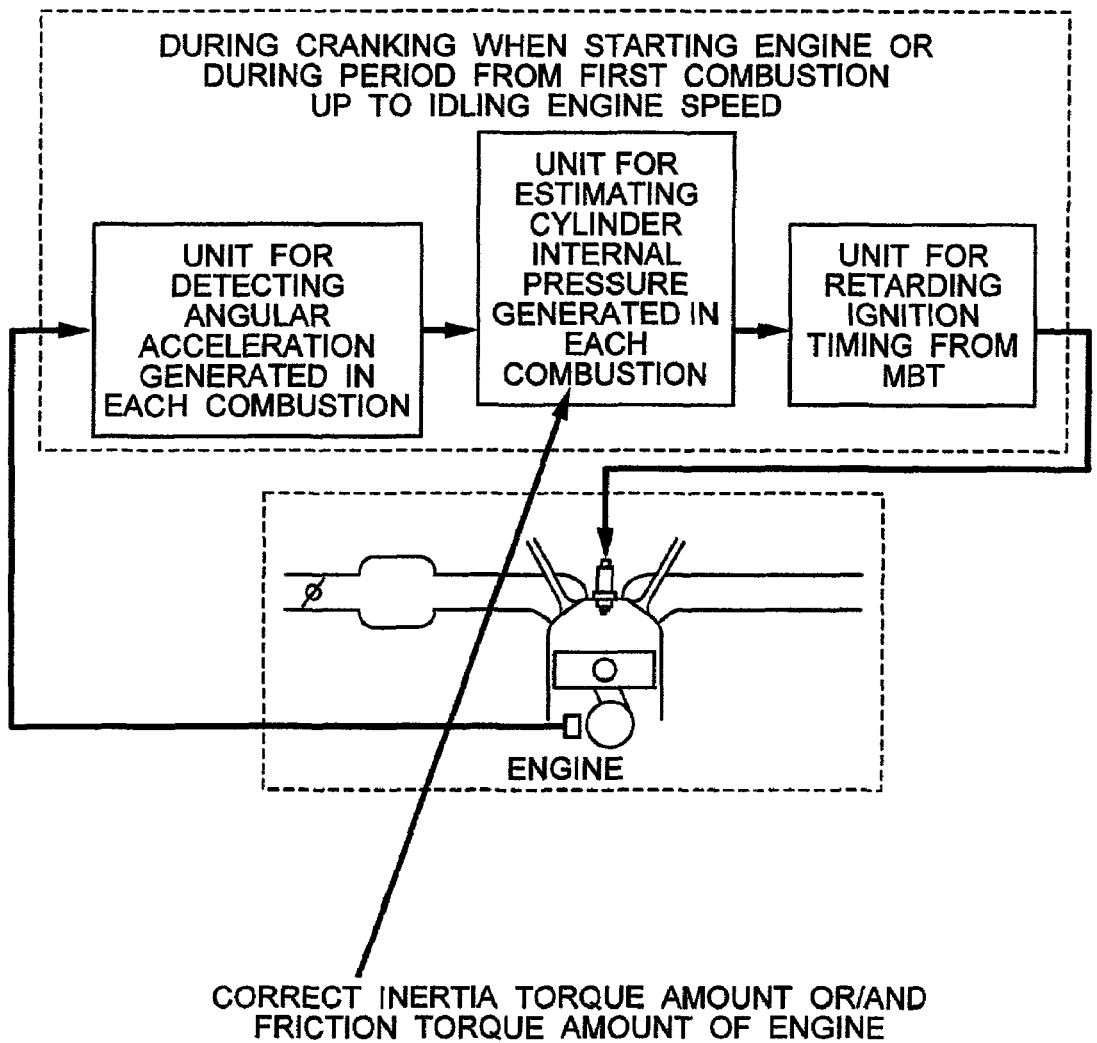
FIG. 7 is the control apparatus for an engine according to still another aspect of the invention.

According to still another aspect of the invention, as shown in FIG. 7, there is provided the control apparatus, further comprising:

a unit for estimating a cylinder internal pressure from the detected angular acceleration.

The control apparatus comprises a unit for determining the combustion pressure from the angular acceleration by using the fact that there is a correlation between the combustion pressure and the angular acceleration from laws of motion.

According to still another aspect of the invention, as shown in FIG. 7, there is provided the control apparatus, further comprising:

in the unit for estimating a cylinder internal pressure from the angular acceleration, a unit for correcting an inertia torque amount or/and friction torque amount of the engine.

As described above, the combustion pressure can be theoretically calculated from the angular acceleration based on the laws of motion. The inertia torque amount or/and friction torque amount of the engine can be considered as physical factors connecting the angular acceleration and the cylinder internal pressure. The inertia torque may be calculated from the engine speed. The friction torque may be calculated from a coolant temperature and the engine speed.

Figure 8:
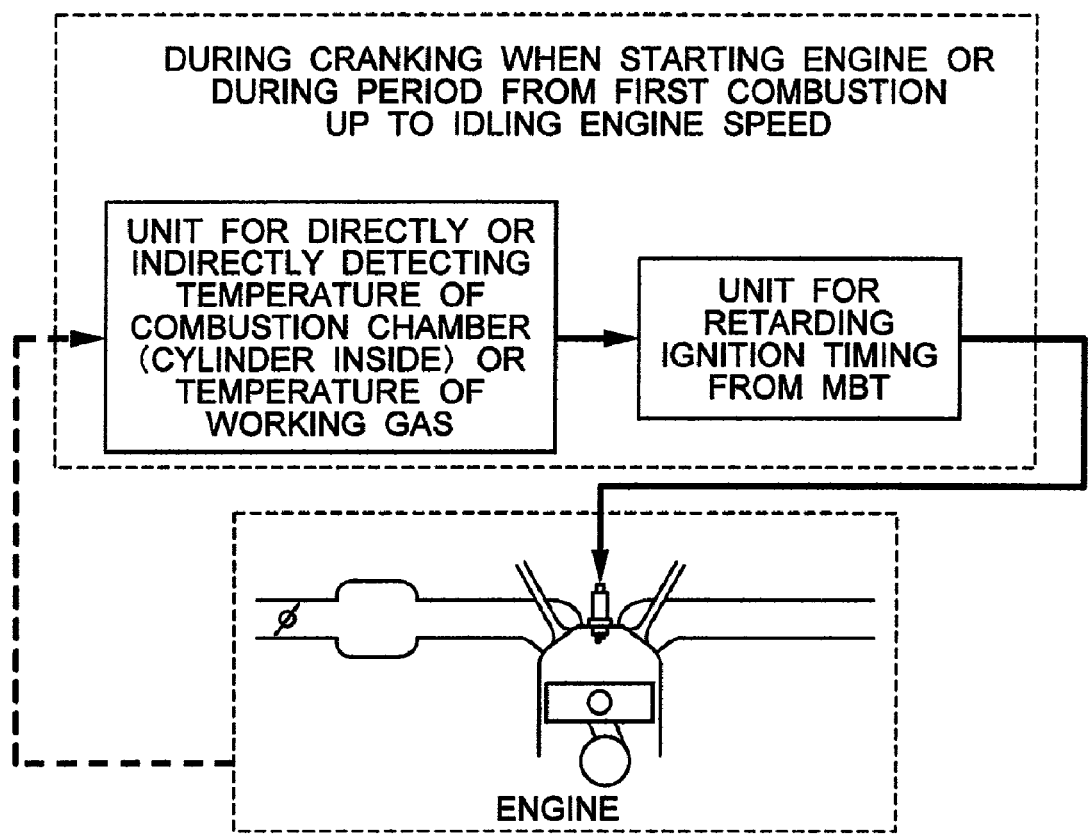
FIG. 8 is the control apparatus for an engine according to still another aspect of the invention.

According to still another aspect of the invention, as shown in FIG. 8, there is provided the control apparatus, further comprising:

a unit for directly or indirectly detecting a temperature in the combustion chamber (cylinder inside) or a temperature of a working gas; and a unit for permitting the retarding or/and a unit for calculating the retard amount based on the temperature in the combustion chamber (cylinder inside) or the temperature of the working gas.

The present invention is made in consideration of the fact that combustion robustness against the retarding of ignition timing is depending on a temperature of the working gas. As described above, a temperature in the combustion chamber (cylinder inside) or a temperature of the working gas is directly or indirectly detected. It is determined as to whether the retarding is performed or not based on the detected temperature values, or the retarding amount is determined based on the detected temperature values. Accordingly, more accurately making the decision, the temperature in the combustion chamber (cylinder inside) or the temperature of the working gas is preferably to be measured immediately before the spark ignition to the cylinder. In addition, the temperature in the combustion chamber (cylinder inside) or the temperature of the working gas may be directly detected, or indirectly detected from detection of an engine coolant temperature and an intake temperature. However, since the temperature in the combustion chamber increases by heat caused by combustion and heat of a residual gas and, therefore, the estimation of the temperature may be performed using a model.

Figure 9:
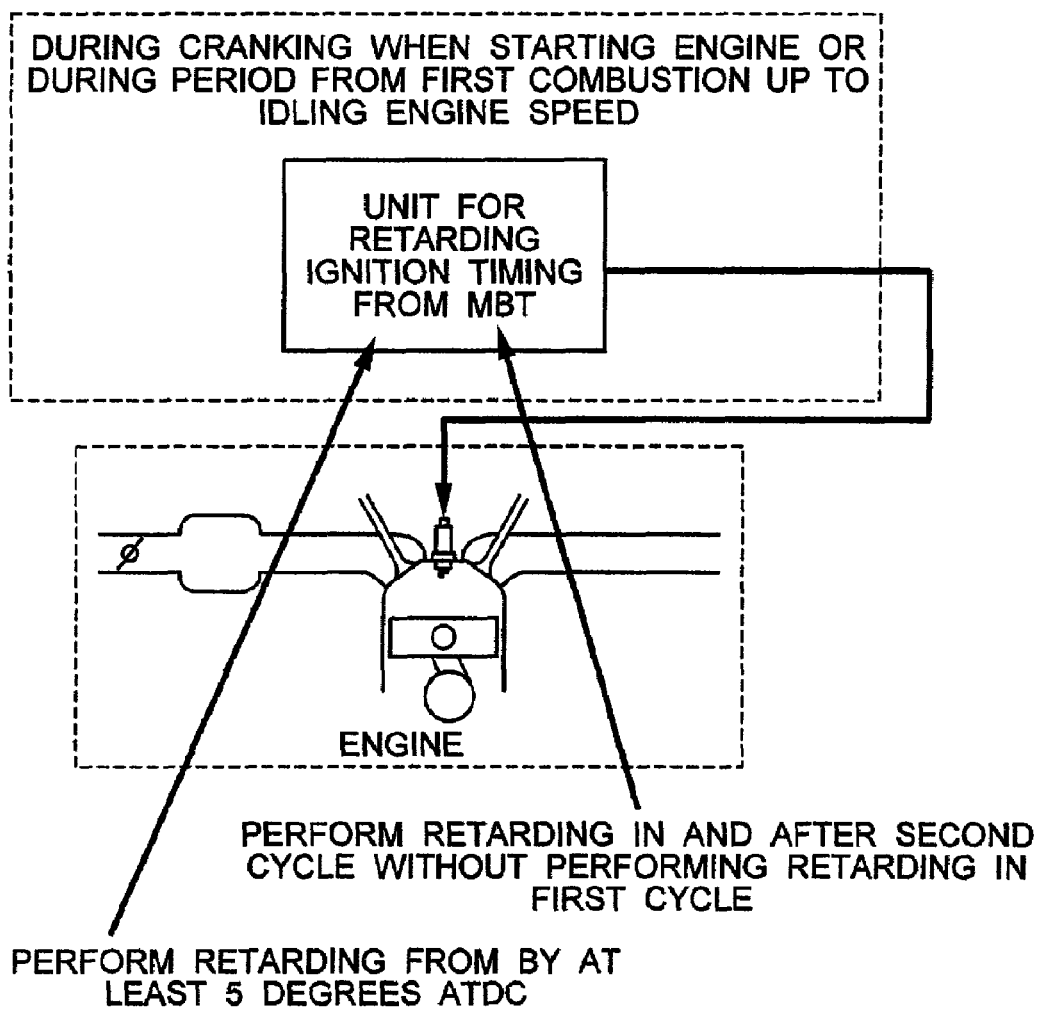
FIG. 9 is the control apparatus for an engine according to still another aspect of the invention.

According to still another aspect of the invention, as shown in FIG. 9, there is provided the control apparatus, further comprising:

the retarding is not performed in a first cycle of the engine but performed in and after a second cycle.

As described above, the combustion robustness against to the retarding depends on the temperature of the working gas. In startup, the temperature in the combustion chamber rapidly increases from a room temperature due to heat caused by combustion. Accordingly, the retarding is not performed at least in a first cycle, because the heat caused by combustion is not sufficiently obtained and the temperature in the combustion chamber is close to the room temperature. Therefore, the retarding is performed in and after a second cycle. In addition, since the temperature of the working gas may not be high even in the second cycle, the retarding may preferably be performed in and after a third cycle.

According to still another aspect of the invention, as shown in FIG. 9, there is provided the control apparatus, further comprising:

the unit for retarding the ignition timing retards the ignition timing from an ATDC by at least 5 degrees during cranking when starting the engine or during a period from the first combustion up to the idling engine speed.

That is, there is an effective retard amount to reduce hydrocarbons during the period when starting the engine or during a period from the first combustion up to the idling engine speed.

Figure 10:
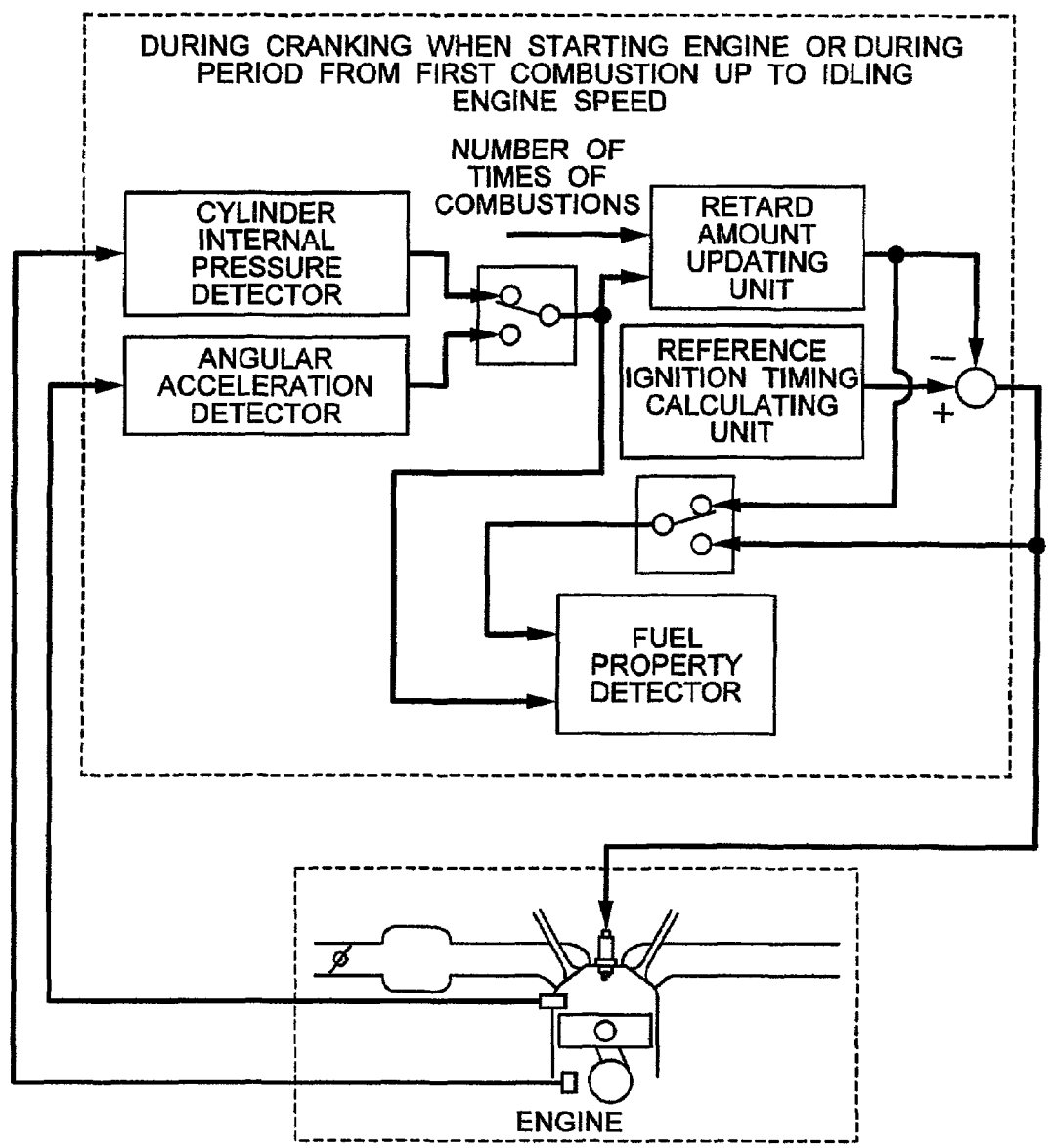
FIG. 10 is the control apparatus for an engine according to still another aspect of the invention.

According to still another embodiment of the invention, as shown in FIG. 10, there is provided the control apparatus, further comprising:

a unit for estimating a fuel property based on the "ignition timing or retard amount", and the "combustion pressure or angular acceleration".

That is, the combustion speed varies depending on the fuel property (components containing hydrocarbons). When the combustion speed varies, the combustion pressure or the angular acceleration also varies according to the combustion speed. Sensitivity to the combustion speed depending on the fuel property increases by performing the retarding. Accordingly, the fuel property can be detected by observing a relationship between the "ignition timing or retard amount", and the "combustion pressure or angular acceleration".

In the present invention, the ignition timing is retarded in an extremely early stage in startup from a time point of the first combustion up to a start of the idling of engine. At the same time, the retard amount is determined based on the combustion pressure or the angular acceleration for each combustion. As a result, the exhaust emissions in such stage in startup can be reduced without deteriorating the stability of the engine.

First Embodiment

Figure 11:
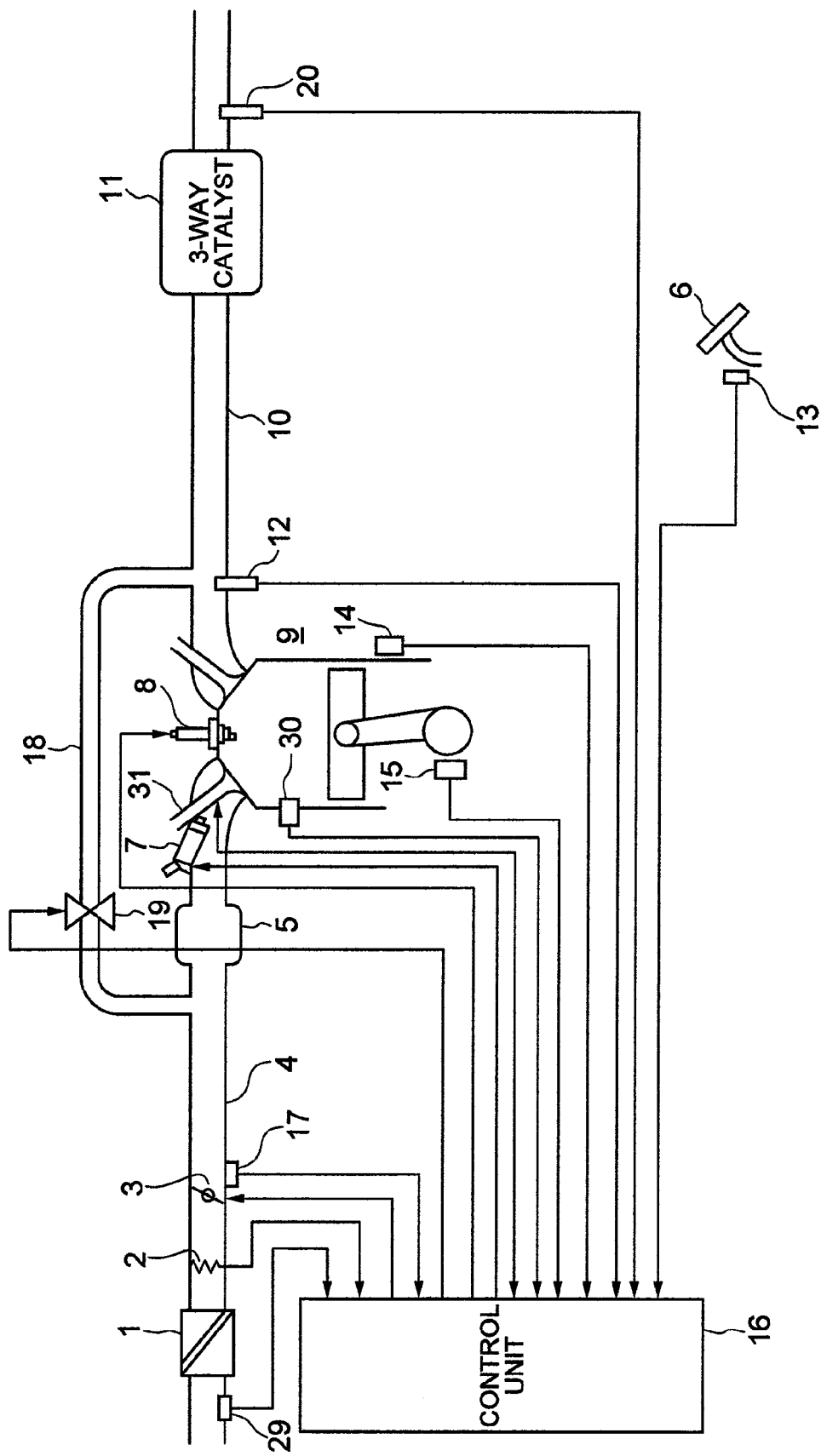
FIG. 11 is a view showing an engine control system according to a first to fourth embodiments of the invention.

FIG. 11 is a system chart showing the present embodiment. In a multicylinder engine 9, air from the outside passes through an air cleaner 1 and flows in a cylinder via an intake manifold 4 and a collector 5. A intake air quantity is adjusted by an electronic control throttle 3. An airflow sensor 2 detects the intake air quantity. A crank angle sensor 15 outputs by the degree a signal of a rotation angle of the crankshaft for each combustion period. A coolant temperature sensor 14 detects a coolant temperature of the engine. An accelerator pedal sensor 13 detects a depressing amount of an accelerator 6 to thereby detect a torque required by a driver. Each signal outputted from the accelerator pedal sensor 13, the airflow sensor 2, a throttle valve opening sensor 17 attached to the electronic throttle 3, the crank angle sensor 15, and the coolant temperature sensor 14 is transmitted to a control unit 16. An operation condition of the engine is obtained from signals outputted from these sensors, and a main operation amount of the engine such as an air quantity, a fuel injection amount and an ignition timing are optimally calculated. The fuel injection amount calculated within the control unit 16 is converted to a valve opening pulse signal and the signal is transmitted to a fuel injection valve 7. Further, a drive signal is transmitted to an ignition plug 8 such that the plug 8 is ignited at the ignition timing that is calculated by the control unit 16. Injected fuel is mixed with air from the intake manifold 4 and flown into the cylinder of the engine 9 to thereby form an air-fuel mixture. An intake valve 31 is a variable valve, and a valve opening timing and a valve closing timing can be controlled, respectively. The air-fuel mixture is exploded by a spark generated by the ignition plug 8 at the predetermined ignition timing and a piston is depressed by the combustion pressure, thereby obtaining motive power of the engine. An exhaust gas after the explosion is sent to a 3-way catalyst 11 via an exhaust manifold 10. A part of the exhaust gas is circulated to an intake side via an EGR pipe 18. A circulation amount is controlled by a valve 19. An A/F (air/fuel ratio) sensor 12 is attached between the engine 9 and the 3-way catalyst 11 and has linear output characteristics to an oxygen concentration contained in the exhaust gas. A relationship between the oxygen concentration and air/fuel ratio in the exhaust gas is almost linear and, therefore, the air/fuel ratio can be calculated based on the signal from the A/F sensor 12 that detects the oxygen concentration. The control unit 16 calculates the air/fuel ratio in an upstream of the 3-way catalyst 11 based on the signal outputted from the A/F sensor 12. Simultaneously, based on the signal outputted from the $O_2$ sensor 20, the control unit 16 calculates the oxygen concentration in a downstream of the 3-way catalyst 11, or determines whether the air/fuel ratio falls in rich or lean side relative to the stoichiometric air fuel ratio. The control unit 16 performs F/B (feedback) control for sequentially correcting a fuel injection amount and an intake air amount so as to optimize a purification efficiency of the 3-way catalyst using signals outputted from both the sensors. Further, an intake temperature sensor 29 detects an intake temperature and a cylinder internal pressure (combustion pressure) sensor 30 detects a cylinder internal pressure (combustion pressure), respectively.

Figure 12:
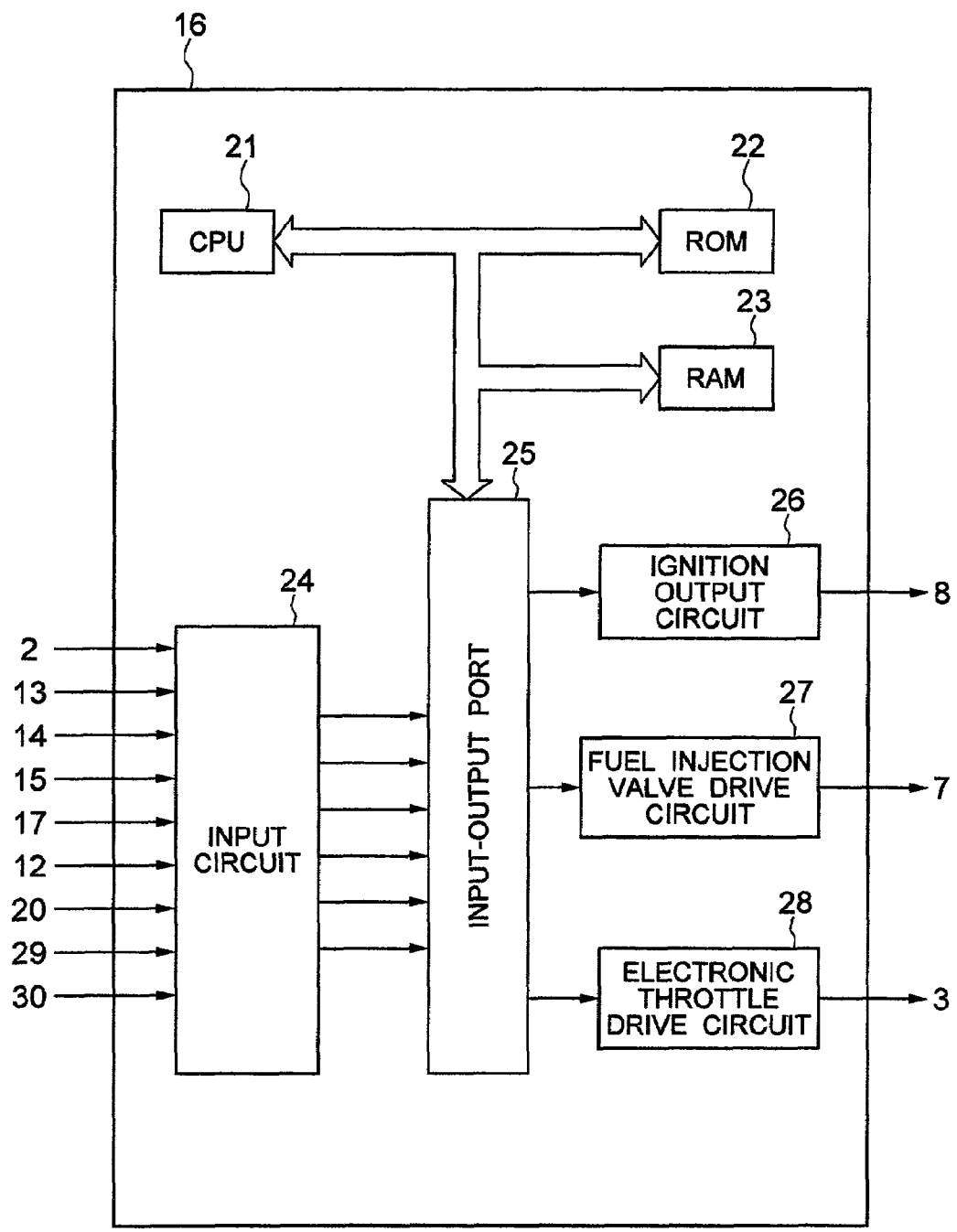
FIG. 12 is a view showing the inside of a control unit according to the first to fourth embodiments of the invention.

FIG. 12 shows an internal structure of the control unit 16. To the control unit 16, various sensor signals outputted from the A/F sensor 12, the throttle valve opening sensor 17, the airflow sensor 2, the crank angle sensor 15, the coolant temperature sensor 14, the accelerator pedal sensor 13, the $O_2$ sensor 20, an intake temperature sensor 29, and the cylinder internal pressure sensor 30 are inputted. Then, an input circuit 24 subjects the signals to a signal processing such as noise reduction, and transmits the signals to an input-output port 25. The signals inputted to the input port are stored in a RAM 23 and subjected to an arithmetic processing in a CPU 21. A control program in which contents of the arithmetic processing are described is previously stored in a ROM 22. Signals representing the values of operating amount for the actuators, which are calculated according to the control program are stored in the RAM 23 and transmitted to the input-output port 25. When a current flows through a primary winding in an ignition output circuit, an actuator signal supplied to an ignition plug is turned ON, whereas when no current flows therethrough, the signal is turned OFF. These ON/OFF signals are set. The ignition timing is at a time when the switching circuit is switched from ON to OFF. A signal for the ignition plug set in the output port is amplified in the ignition output circuit 26 to provide energy necessary and sufficient for the combustion and is transmitted to the ignition plug. Further, the ON/OFF signals for driving the fuel injection valve are set. That is, a drive signal to the fuel injection valve is ON state to open the fuel injection valve, and OFF state to close the fuel injection valve. The drive signal is amplified in a fuel injection valve drive circuit 27 to energy sufficient for opening the fuel injection valve and is transmitted to the fuel injection valve 7. A drive signal for realizing a target throttle opening of the electronic throttle 3 is transmitted to the electronic throttle 3 via the electronic throttle drive circuit 28. The control program that is written in the ROM 22 will be described below.

Figure 13:
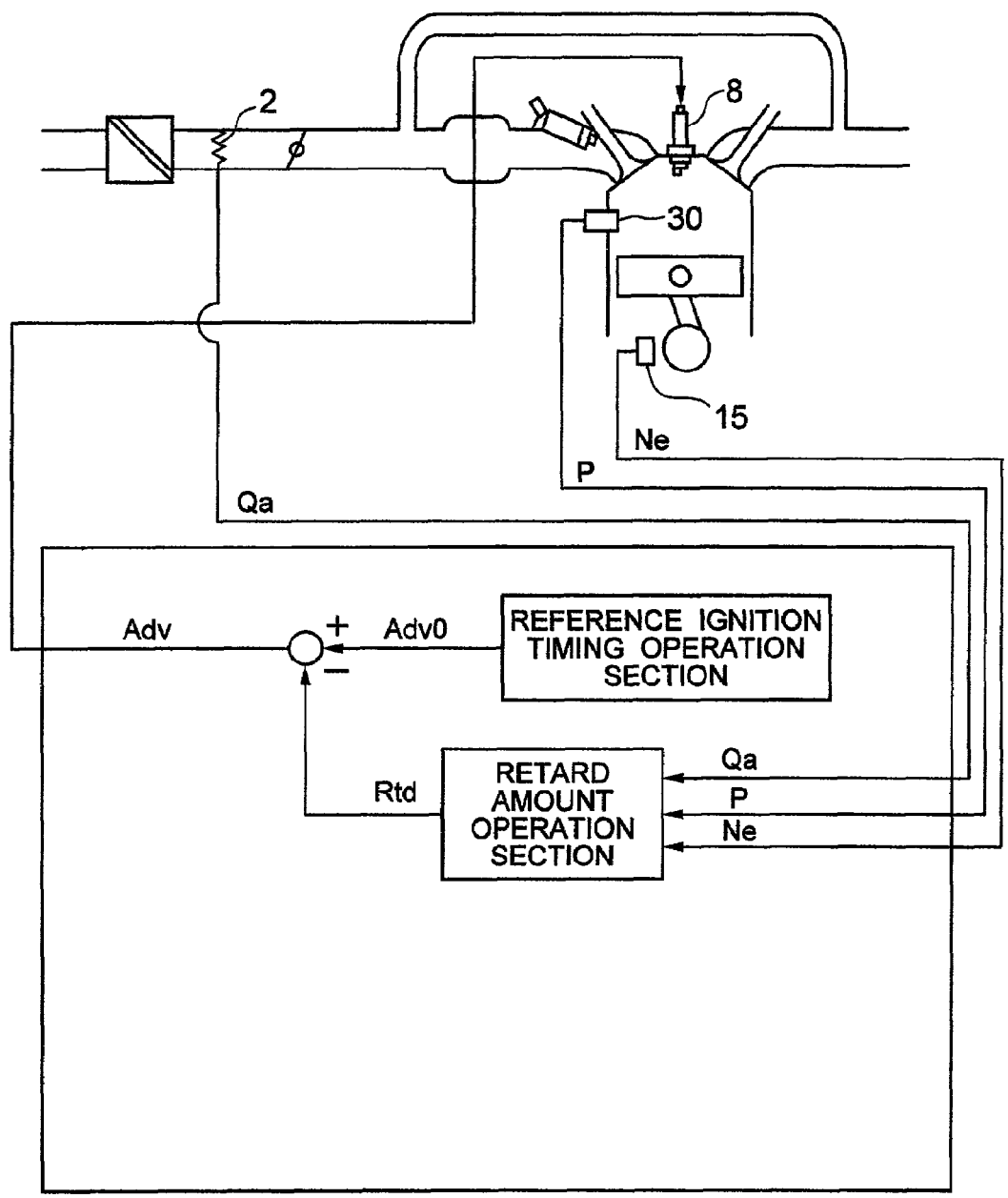
FIG. 13 is a block diagram showing the entire control according to the first embodiment of the invention.
Figure 14:
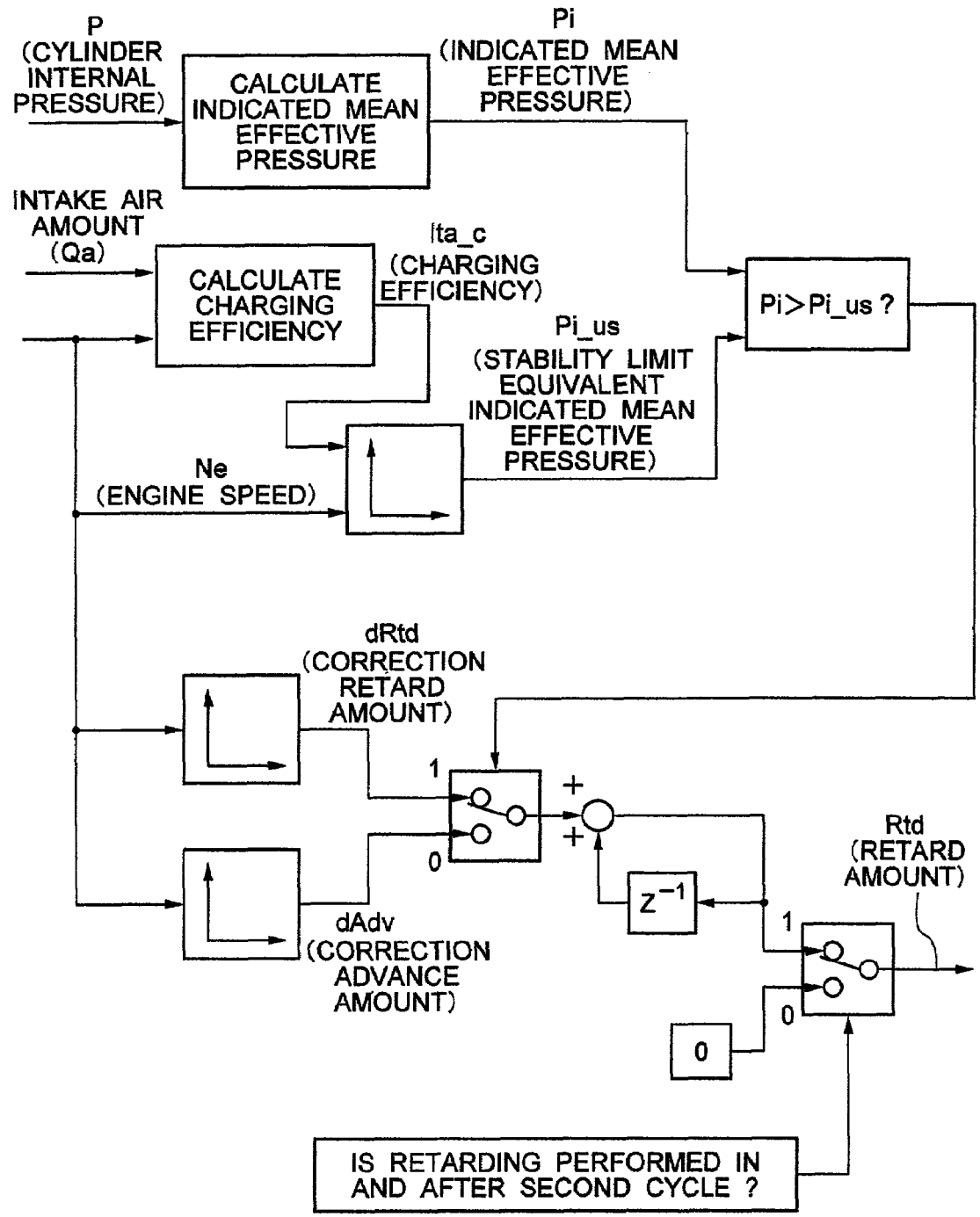
FIG. 14 is a block diagram showing a retard amount calculating section according to the first embodiment of the invention.

FIG. 13 is a block diagram showing the entire control system, and the system includes the following operation sections, such as "Reference ignition timing operation section" and "Retard amount operation section" (FIG. 14).

The "reference ignition timing operation section" calculates the reference ignition timing (Adv0). The value of Adv0 is set to be near the MBT and the calculating method is conventionally and generally used; therefore, the brief explanation will be made here. For example, the reference ignition timing is calculated from the engine speed and the charging efficiency. The "retard amount operation section" calculates the retard amount (Rtd). The stability of the combustion is detected from output signals (P) from the cylinder internal pressure sensor 30, and the retard amount is gradually increased up to the stability limit.

The "retard amount operation section" will be described in detail below.

<Retard Amount Operation Section (FIG. 14)>

This operation section calculates the retard amount (Rtd) as illustrated in FIG. 14. An indicated mean effective pressure (Pi) is calculated from values detected by the cylinder internal pressure sensor 30. From the charging efficiency (Ita_c) and the engine speed (Ne), a stability limit equivalent indicated mean effective pressure (Pi_us) is calculated in reference to tables. The charging efficiency (Ita_c) is calculated from the air amount (Qa) obtained from the airflow sensor 2 and the engine speed (Ne). Since the calculating method of the charging efficiency is the conventional technology, the detailed explanation will not be made here. The value of Pi is compared to the value of Pi_us. If Pi>Pi_us holds true, the combustion pressure is sufficiently high and the combustion does not reach the stability limit. The correction amount (dRtd) for updating retard amount is added to a previous retard correction value to obtain the latest retard amount (Rtd). On the other hand, if Pi<Pi_us holds true, the combustion pressure is low and reaches the stability limit of the combustion. An correction amount (dAdv) for updating retard amount is added to the previous retard correction value to obtain the latest retard amount (Rtd). The dRtd and the dAdv are determined from the engine speed Ne. In addition, the dAdv has a negative value. The retard amount is set to zero until the second cycle.

The reason that the dRtd and the dAdv are determined from the Ne is as described above. That is, when the engine speed is relatively low, the retard amount is relatively small also in consideration of start performance of the engine. As the engine speed more increases to some extent and the startability is more established, the retard amount is more increased.

Likewise, the reason that the retard amount is set to zero in the first cycle is as described above. That is, the combustion robustness to the retarding depends on a temperature of the working gas. In startup, a temperature in the combustion chamber rapidly increases from the room temperature due to heat caused by the combustion. Accordingly, the retarding is not performed at least in the first cycle in which the heat caused by the combustion is not obtained and the temperature in the combustion chamber is equivalent to the room temperature. Then, the retarding is performed in and after the second cycle. In addition, since the temperature of the working gas may not be elevated also in the second cycle, the retarding may be performed in and after the third cycle.

Second Embodiment

In the first embodiment, the stability limit due to the retarding is detected from the cylinder internal pressure (combustion pressure). In the second embodiment, the stability limit is detected using the crank angle signal of the engine.

FIG. 11 is a system chart showing the present embodiment of the invention. A system in the present embodiment is the same as that described in the first embodiment and, therefore, the detailed descriptions will not be repeated.

FIG. 12 shows an internal structure of the control unit 16. The control unit 16 in the present embodiment is the same as that described in the first embodiment and, therefore, the detailed descriptions will not be repeated.

Figure 15:
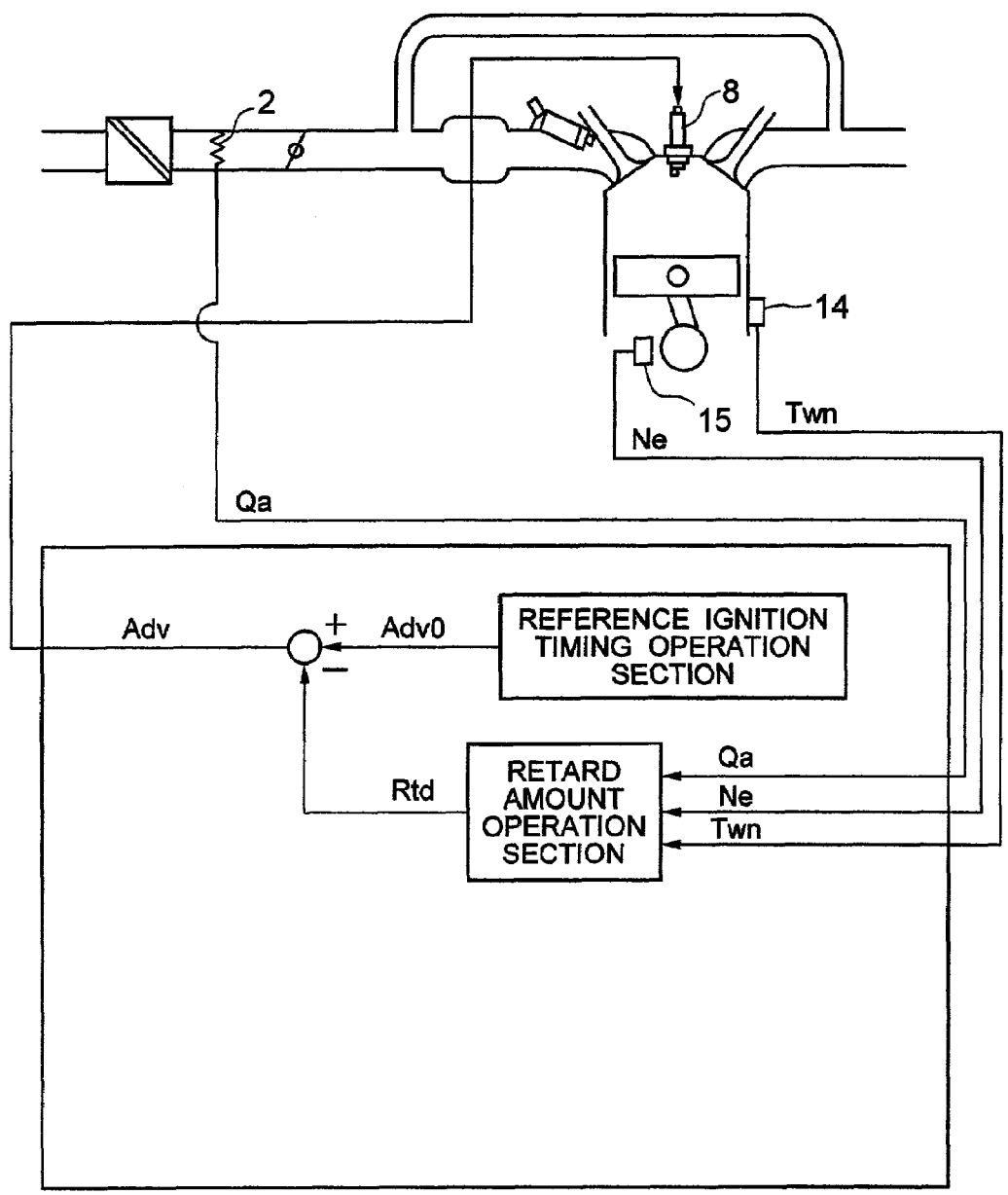
FIG. 15 is a block diagram showing the entire control according to the second embodiment of the invention.
Figure 16:
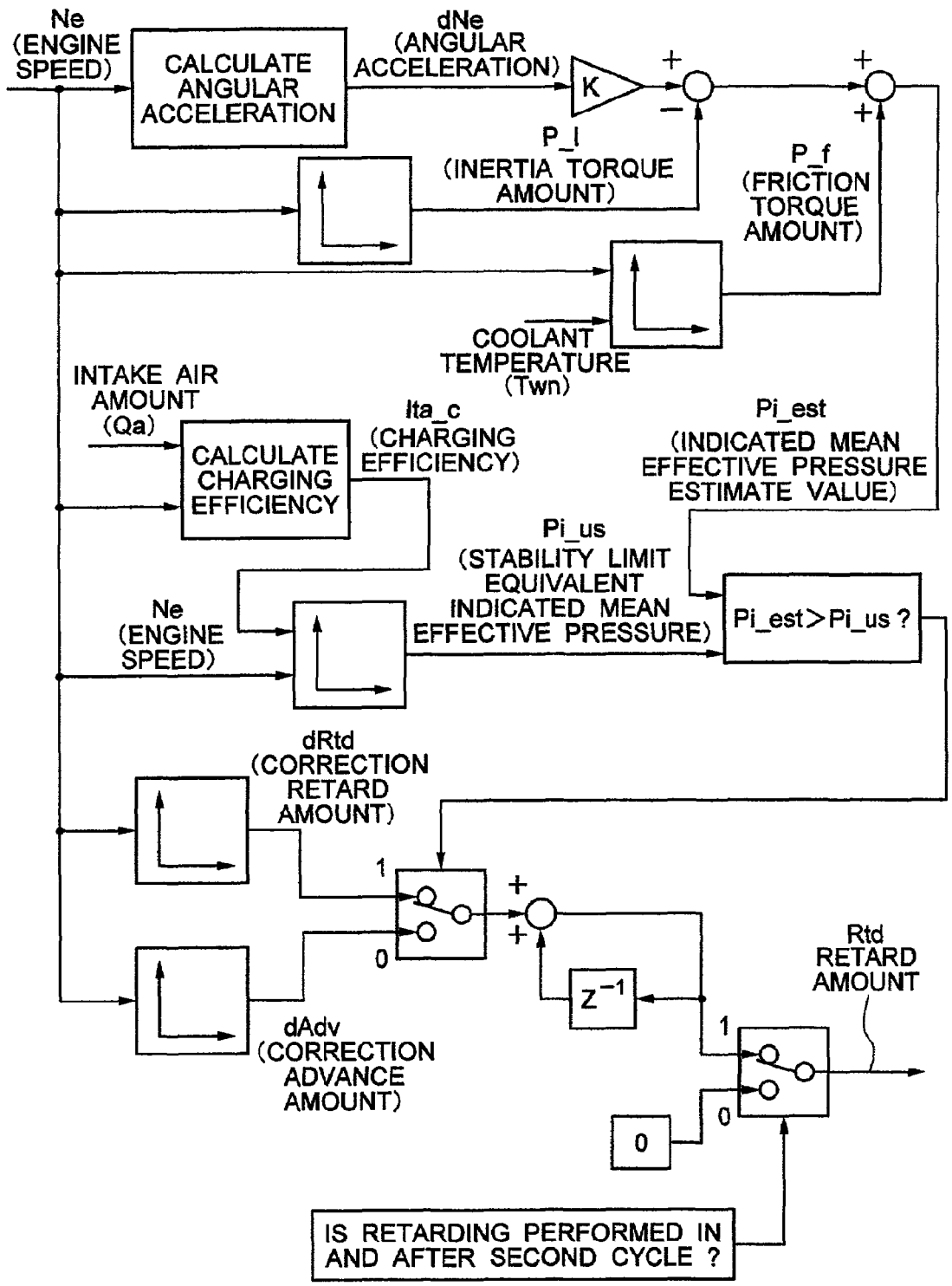
FIG. 16 is a block diagram showing the retard amount calculating section according to the second embodiment of the invention.

FIG. 15 is a block diagram showing the entire control system, and the system has the operation sections including:
 reference ignition timing operation section; and
 retard amount operation section (FIG. 16).

The "reference ignition timing operation section" calculates the reference ignition timing (Adv0). The Adv0 is set to be near the MBT and the calculating method is conventionally and generally used; therefore, the detailed descriptions will not be repeated here. The "retard amount operation section" calculates the retard amount (Rtd). The angular acceleration is calculated from signals outputted from the crank angle sensor 15 and further, the cylinder internal pressure (combustion pressure) is estimated from the angular acceleration. The stability of the combustion is detected from the estimated cylinder internal pressure (combustion pressure), and the retard amount is gradually increased until the stability limit.

The "retard amount operation section" will be described in detail below.

<Retard Amount Operation Section (FIG. 16)>

This operation section calculates the retard amount (Rtd). Specifically, FIG. 16 shows the calculation.

The angular acceleration (dNe) is calculated from the engine speed (Ne) calculated from signals outputted from the crank angle sensor 15. The angular acceleration equivalent torque (combustion pressure) is calculated by multiplying the dNe by a constant K. Then, the inertia torque amount (P_I) is subtracted from the angular acceleration equivalent torque amount and the friction torque amount (P_f) is added to the above difference to thereby obtain the indicated mean effective pressure estimate value (Pi_est). The P_I is calculated from the Ne in reference to tables. The P_f is calculated from the Ne and the Twn in reference to tables.

From the charging efficiency (Ita_c) and the engine speed (Ne), the stability limit equivalent indicated mean effective pressure (Pi_us) is calculated in reference to tables. The charging efficiency (Ita_c) is calculated from the air amount (Qa) obtained from the airflow sensor 2 and the engine speed (Ne). Since the calculating method of the charging efficiency is disclosed as the conventional technology, the detailed descriptions will not be repeated here.

The Pi_est is compared to the Pi_us. If Pi_est>Pi_us holds true, the combustion pressure is sufficiently high and does not reach the stability limit. A correction updated retard amount (dRtd) is added to a previous retard correction value to obtain the latest retard amount (Rtd). On the other hand, if Pi_est<Pi_us holds true, the combustion pressure is low and reaches the stability limit. An correction advance amount (dAdv) is added to the previous retard correction value to obtain the latest retard amount (Rtd). The dRtd and the dAdv are determined from the Ne. In addition, the dAdv has a negative value. The retard amount is set to zero until the second cycle.

The reason that the dRtd and the dAdv are determined from the Ne is as described above. That is, when the engine speed is relatively low, the retard amount is relatively small also in consideration of start performance of the engine. As the engine speed more increases to some extent and the startability is more established, the retard amount is more increased.

Likewise, the reason that the retard amount is set to zero in the first cycle is as described above. That is, the combustion robustness against to the retarding depends on a temperature of the working gas. In startup, a temperature in the combustion chamber rapidly increases from the room temperature due to heat caused by the combustion. Accordingly, the retarding is not performed at least in the first cycle in which the heat caused by the combustion is not obtained and the temperature in the combustion chamber is equivalent to the room temperature. Then, the retarding is performed in and after the second cycle. In addition, since the temperature of the working gas may not be elevated also in the second cycle, the retarding may be performed in and after the third cycle.

Third Embodiment

In the first and second embodiments, the retarding is performed in and after the second cycle. In the third embodiment, the retarding is determined based on the temperature in the combustion chamber. In addition, the stability limit is detected using the crank angle signal of the engine in the same manner as in the second embodiment.

FIG. 11 is a system chart showing the present embodiment of the invention. A system in the present embodiment is the same as that described in the first embodiment and, therefore, the detailed descriptions will not be repeated.

FIG. 12 shows an internal structure of the control unit 16. The control unit 16 in the present embodiment is the same as that described in the first embodiment and, therefore, the detailed descriptions will not be repeated.

Figure 17:
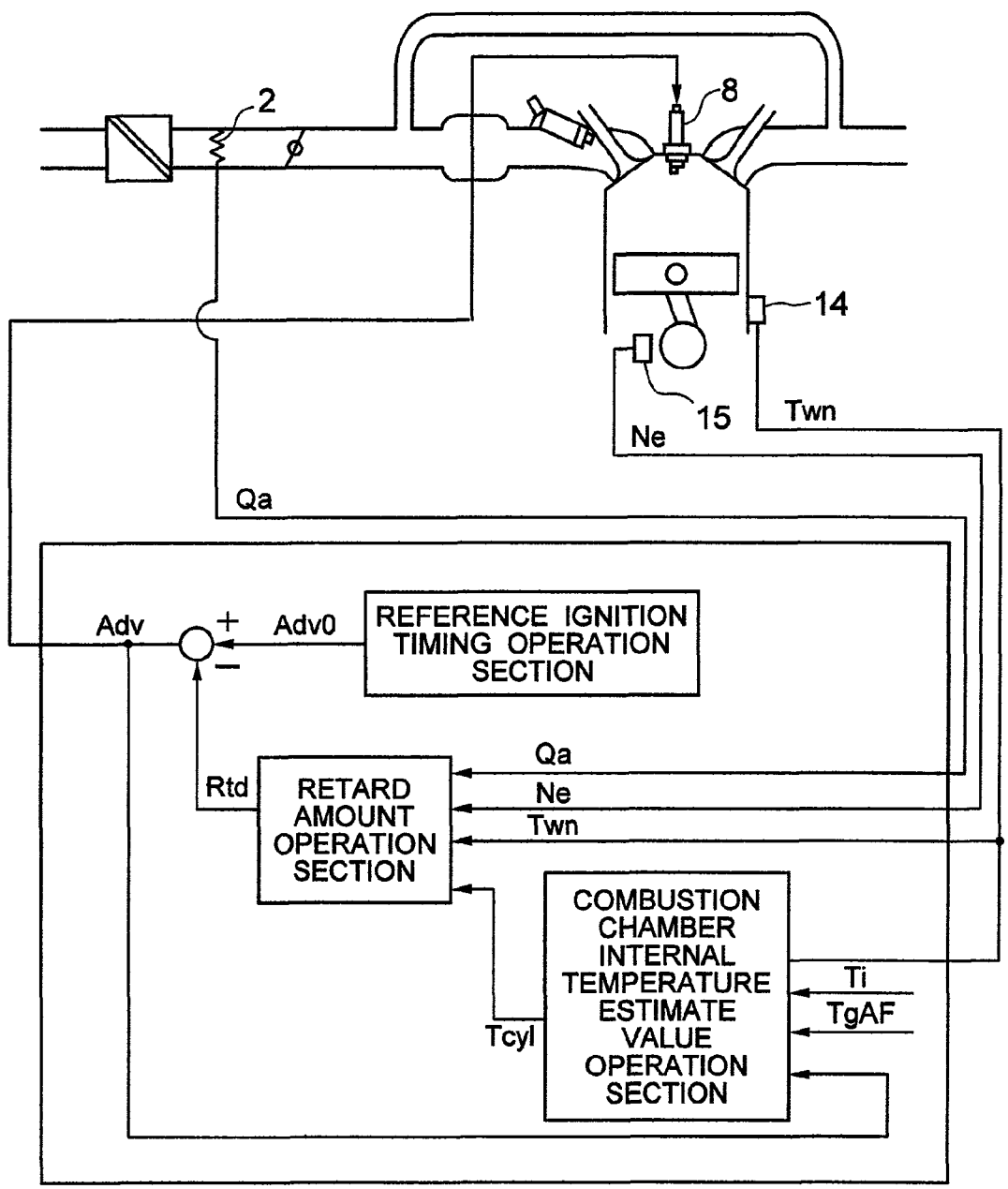
FIG. 17 is a block diagram showing the entire control according to the third embodiment of the invention.
Figure 19:
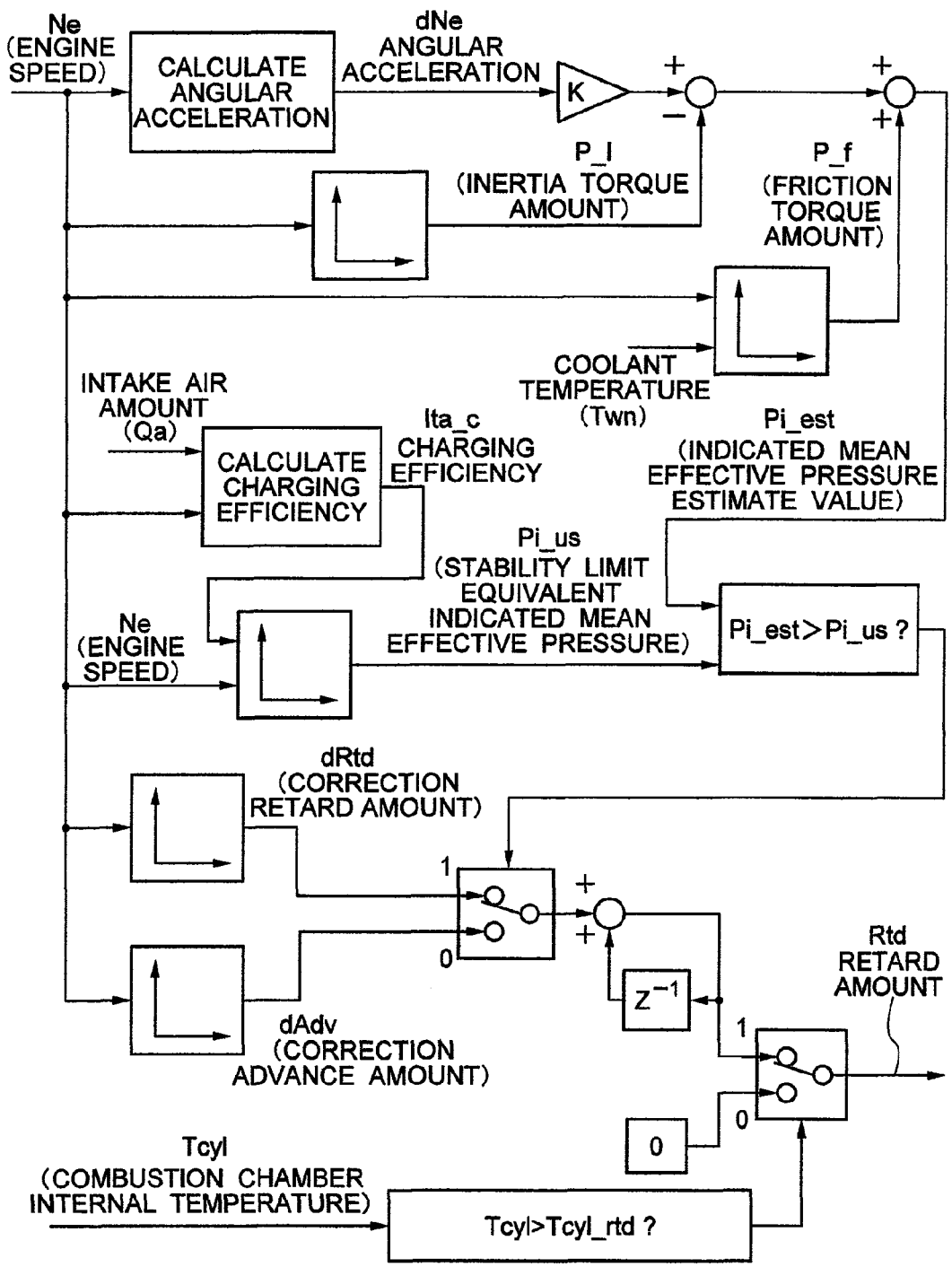
FIG. 19 is a block diagram showing the retard amount calculating section according to the third embodiment of the invention.

FIG. 17 is a block diagram showing the entire control system, and the system has the operation sections including:
 reference ignition timing operation section;
 combustion chamber internal temperature estimate value operation section (FIG. 18); and
 retard amount operation section (FIG. 19).

The "reference ignition timing operation section" calculates the reference ignition timing (Adv0). The Adv0 is set to be near the MBT and the calculating method is conventionally and generally used; therefore, the detailed descriptions will not be repeated here. The "combustion chamber internal temperature estimate value operation section" calculates the combustion chamber internal temperature estimate value (Tcyl). The "retard amount operation section" calculates the retard amount (Rtd). The angular acceleration is calculated from signals outputted from the crank angle sensor 15 and further, the cylinder internal pressure (combustion pressure) is estimated from the angular acceleration. The stability of the combustion is detected from the estimated cylinder internal pressure (combustion pressure), and the retard amount is gradually increased until the stability limit. However, note that whether the retarding is performed is determined based on the combustion chamber internal temperature (Tcyl).

The "combustion chamber internal temperature estimate value operation section" and the "retard amount operation section" will be described in detail below.

<Combustion Chamber Internal Temperature Estimate Value Operation Section (FIG. 18)>

This operation section calculates the combustion chamber internal temperature (Tcyl). Specifically, FIG. 18 shows the calculation. Using as an argument the fuel injection amount (Ti), the basic heating value is calculated in reference to maps. The basic heating value is multiplied by the combustion air/fuel ratio correction value and the ignition timing correction value and further, the obtained product is multiplied by the heat capacity coefficient (C) and the heat conductivity coefficient (κ) to thereby obtain a heating value to be supplied. Using as an argument the target air/fuel ratio (Tg_AF), a combustion air/fuel ratio correction coefficient is calculated in reference to maps. The calculating method of the Tg_AF is conventionally and generally used and, therefore, the detailed descriptions will not be repeated here. The above coefficient is calculated from parameters typifying operation conditions such as the engine speed and the charging efficiency (or target torque). Using as an argument the ignition timing (Adv), the ignition timing correction coefficient is calculated in reference to maps. Using as an argument the coolant temperature (Twn), a heating value to be radiated is calculated in reference to maps. The intake temperature in startup (Ths) is used as an initial value of the combustion chamber internal temperature estimate value. Then, a heat balance calculation between the heating value to be supplied and the heating value to be radiated is performed for each combustion occurrence to update the combustion chamber internal temperature estimate value. Each of the map values may be determined through experiments.

<Retard Amount Operation Section (FIG. 19)>

This operation section calculates the retard amount (Rtd). Specifically, FIG. 19 shows the calculation.

The angular acceleration (dNe) is calculated from the engine speed (Ne) calculated from signals outputted from the crank angle sensor 15. The angular acceleration equivalent torque (combustion pressure) is calculated by multiplying the dNe by a constant K. Then, the inertia torque amount (P_I) is subtracted from the angular acceleration equivalent torque amount and the friction torque amount (P_f) is added to the above difference to thereby obtain the indicated mean effective pressure estimate value (Pi_est). The P_I is calculated from the Ne in reference to tables. The P_f is calculated from the Ne and the Twn in reference to tables.

From the charging efficiency (Ita_c) and the engine speed (Ne), the stability limit equivalent indicated mean effective pressure (Pi_us) is calculated in reference to tables. The charging efficiency (Ita_c) is calculated from the air amount (Qa) obtained from the airflow sensor 2 and the engine speed (Ne). Since the calculating method of the charging efficiency is disclosed as the conventional technology, the detailed descriptions will not be repeated here.

The Pi_est is compared to the Pi_us. If Pi_est>Pi_us holds true, the combustion pressure is sufficiently high and does not reach the stability limit. A correction retard amount (dRtd) is added to a previous retard correction value to obtain the latest retard amount (Rtd). On the other hand, if Pi_est<Pi_us holds true, the combustion pressure is low and reaches the stability limit. A correction advance amount (dAdv) is added to the previous retard correction value to obtain the latest retard amount (Rtd). The dRtd and the dAdv are determined from the Ne. In addition, the dAdv has a negative value.

When Tcyl>Tcyl_rtd holds true, the retarding of the ignition timing is started.

The reason that the dRtd and the dAdv are determined from the Ne is as described above. That is, when the engine speed is relatively low, the retard amount is relatively small also in consideration of start performance of the engine. As the engine speed more increases to some extent and the startability is more established, the retard amount is more increased.

Further, the reason that when Tcyl>Tcyl_rtd holds true, the retarding of the ignition timing is started is as described above. That is, the combustion robustness to the retarding depends on a temperature of the working gas. In startup, a temperature in the combustion chamber rapidly increases from the room temperature due to heat caused by the combustion. Accordingly, when Tcyl>Tcyl_rtd that represents a state where the temperature in the combustion chamber reaches a temperature at which the combustion robustness to the retarding is secured holds true, the retarding of the ignition timing is performed. The Tcyl_rtd may be determined through experiments.

Fourth Embodiment

In the fourth embodiment, the fuel property is estimated based on the ignition timing (retard amount) and the combustion pressure. FIG. 11 is a system chart showing the present embodiment of the invention. A system in the present embodiment is the same as that described in the first embodiment and, therefore, detailed descriptions will not be repeated. FIG. 12 shows an internal structure of the control unit 16. The control unit 16 in the present embodiment is the same as that described in the first embodiment and, therefore, detailed descriptions will not be repeated.

Figure 20:
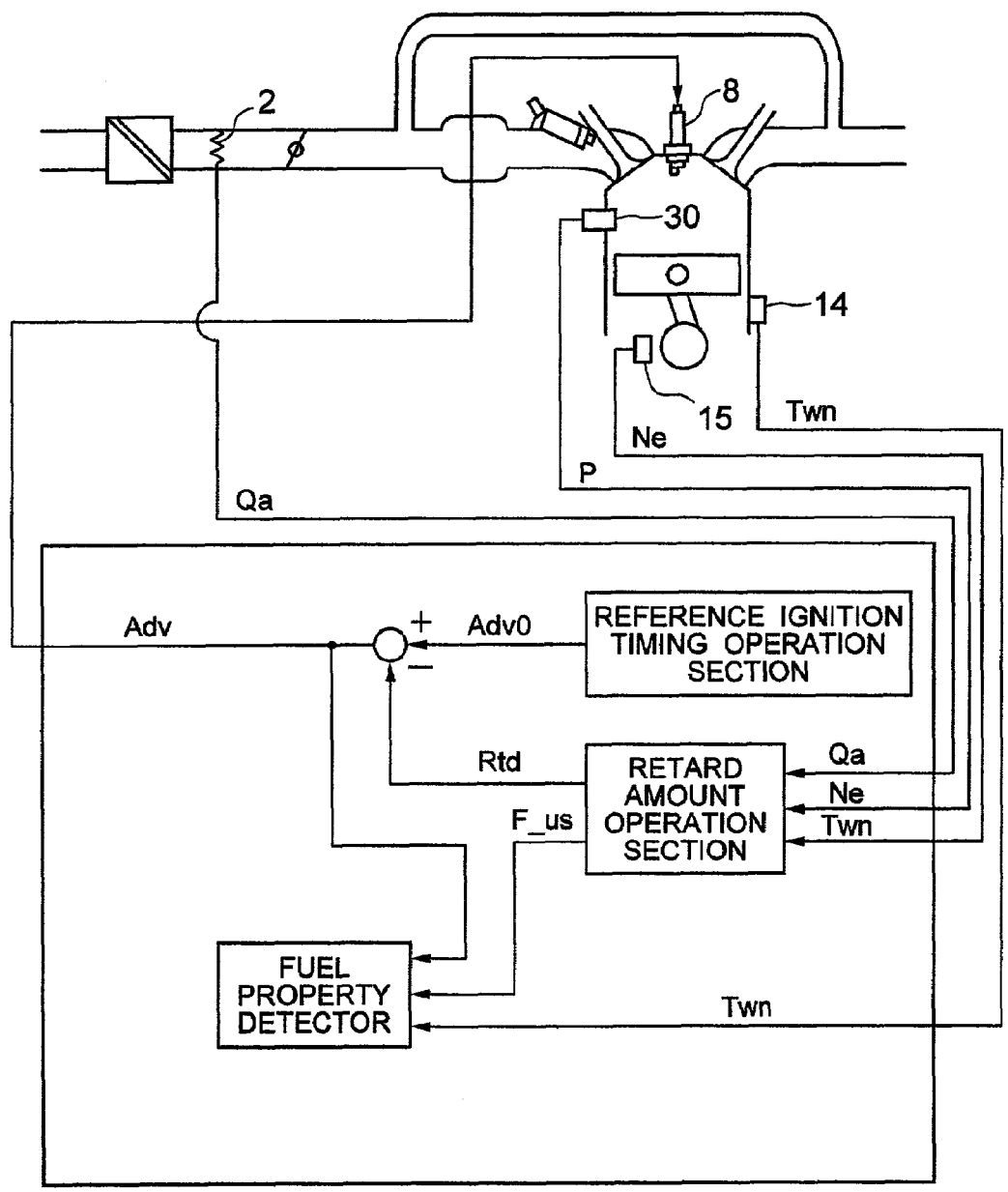
FIG. 20 is a block diagram showing the entire control according to the fourth embodiment of the invention.
Figure 21:
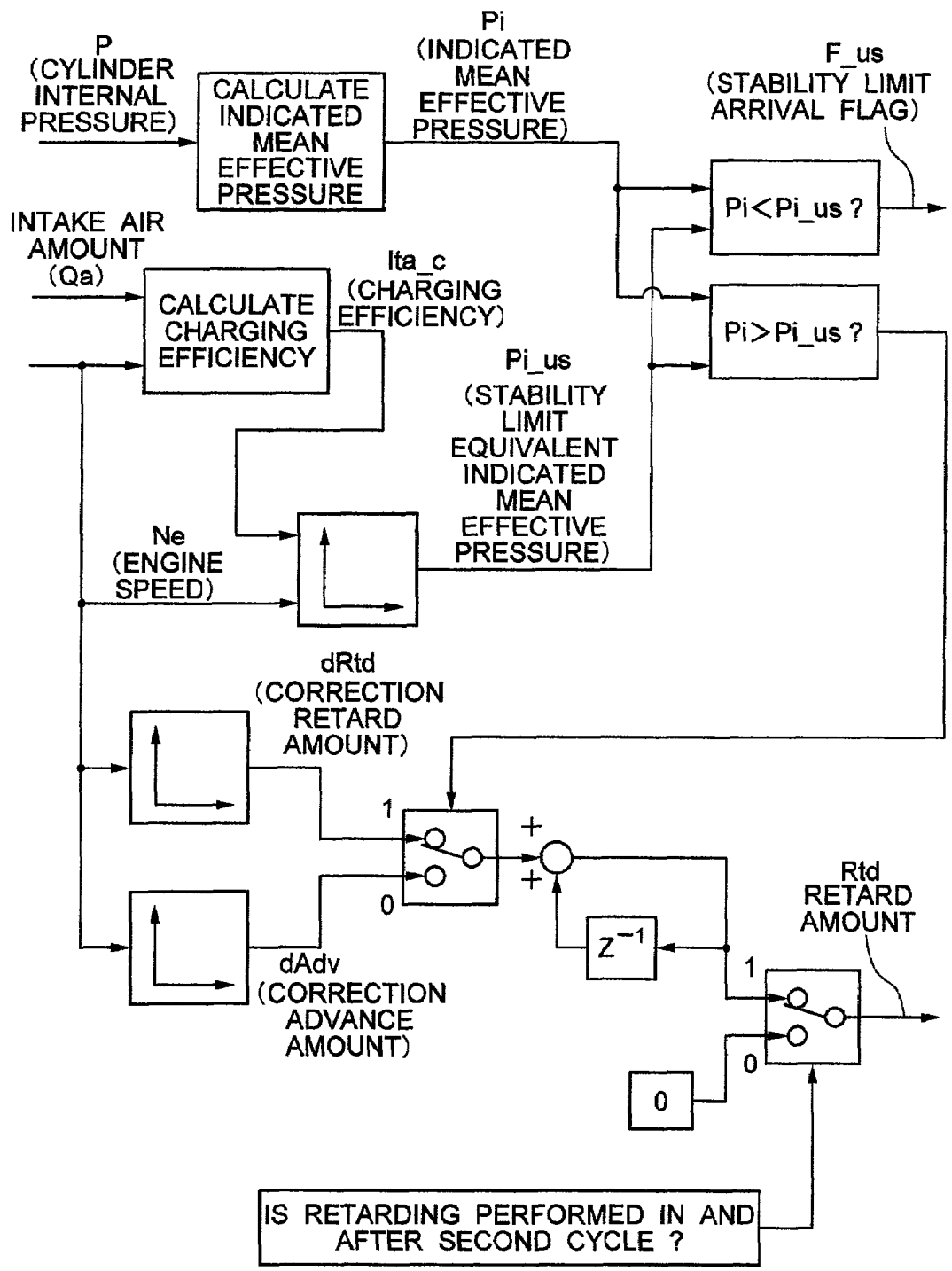
FIG. 21 is a block diagram showing the retard amount calculating section according to the fourth embodiment of the invention.
Figure 22:
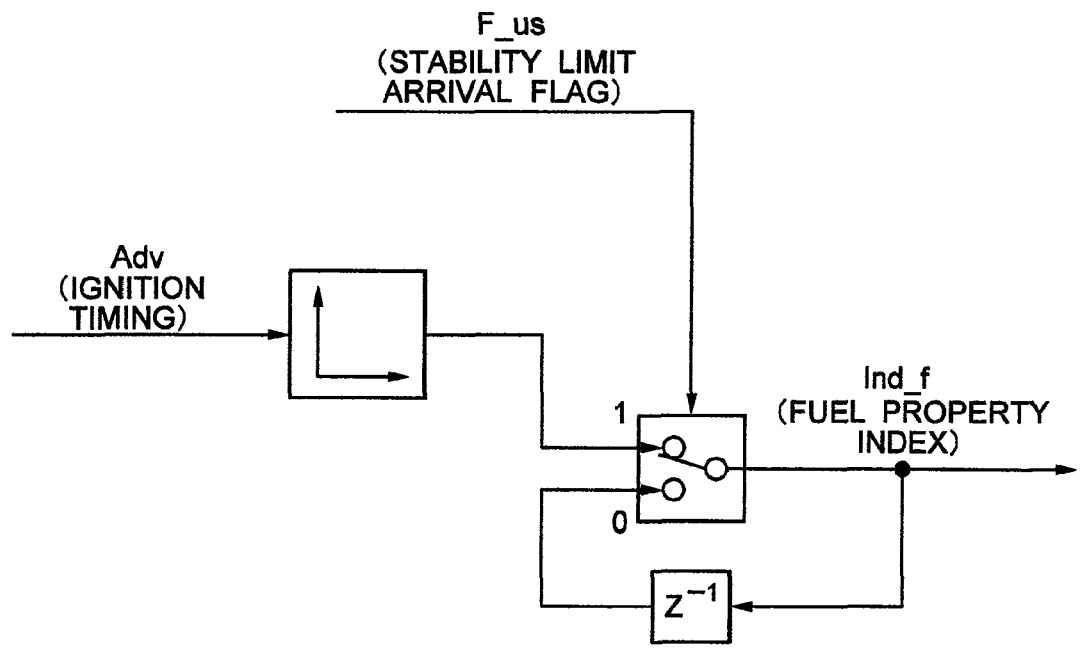
FIG. 22 is a block diagram showing a fuel property detector according to the fourth embodiment of the invention.

FIG. 20 is a block diagram showing the entire control system, and the system has the operation sections including:
reference ignition timing operation section;
retard amount operation section (FIG. 21); and
fuel property detector (FIG. 22).

The "reference ignition timing operation section" calculates the reference ignition timing (Adv0). The Adv0 is set to be near the MBT and the calculating method is conventionally and generally used; therefore, the detailed descriptions will not be repeated here. The "retard amount operation section" calculates the retard amount (Rtd) and the stability limit arrival flag (F_us). The stability of the combustion is detected from signals (P) outputted from the cylinder internal pressure sensor 30, and the retard amount (Rtd) is gradually increased until the stability limit. When the retard amount reaches the stability limit, the equation F_us=1 holds true. In the "fuel property detector", the fuel property is detected from the ignition timing (retard amount) when the equation F_us=1 holds true, namely, when the retard amount reaches the stability limit.

The "retard amount operation section" and the "fuel property detector" will be described in detail below.

<Retard Amount Operation Section (FIG. 21)>

This operation section calculates the retard amount (Rtd). Specifically, FIG. 21 shows the calculation.

The indicated mean effective pressure (Pi) is calculated from values detected by the cylinder internal pressure sensor 30.

From the charging efficiency (Ita_c) and the engine speed (Ne), the stability limit equivalent indicated mean effective pressure (Pi_us) is calculated in reference to tables. The charging efficiency (Ita_c) is calculated from the air amount (Qa) obtained from the airflow sensor 2 and the engine speed (Ne). Since the calculating method of the charging efficiency is disclosed as the conventional technology, the detailed descriptions will not be repeated here.

The Pi is compared to the Pi_us. If Pi>Pi_us holds true, the combustion pressure is sufficiently high and does not reach the stability limit. A correction retard amount (dRtd) is added to a previous retard correction value to obtain the latest retard amount (Rtd). On the other hand, if Pi<Pi_us holds true, the combustion pressure is low and reaches the stability limit. The stability limit arrival flag (F_us) is set to one and a correction updated advance amount (dAdv) is added to the previous retard correction value to obtain the latest retard amount (Rtd). The dRtd and the dAdv are determined from the Ne. In addition, the dAdv has a negative value. The retard amount is set to zero until the second cycle.

The reason that the dRtd and the dAdv are determined from the Ne is as described above. That is, when the engine speed is relatively low, the retard amount is relatively small also in consideration of start performance of the engine. As the engine speed more increases to some extent and the startability is more established, the retard amount is more increased.

Likewise, the reason that the retard amount is set to zero in the first cycle is as described above. That is, the combustion robustness to the retarding depends on a temperature of the working gas. In startup, a temperature in the combustion chamber rapidly increases from the room temperature due to heat caused by the combustion. Accordingly, the retarding is not performed at least in the first cycle in which the heat caused by the combustion is not obtained and the temperature in the combustion chamber is equivalent to the room temperature. Then, the retarding is performed in and after the second cycle. In addition, since the temperature of the working gas may not be elevated also in the second cycle, the retarding may be performed in and after the third cycle.

<Fuel Property Detector (FIG. 22)>

This operation section calculates a fuel property index (Ind_f). Specifically, FIG. 22 shows the calculation.

The fuel property index (Ind_f) is calculated in reference to tables from the ignition timing (Adv) when the stability limit arrival flag (F_us) is set to one.

The combustion speed varies depending on the fuel property. Accordingly, the ignition timing as the stability limit varies depending on the fuel property. As described above, using this principle, the fuel property is detected in an extremely early stage in startup. The detailed descriptions will not be repeated here, but the engine may be optimally controlled according to the detected fuel property.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A control apparatus for an engine, comprising:
    means for retarding an ignition timing from an MBT by a predetermined value or more, during a period of cranking at engine starting or during a period from a first combustion reaching to an idling engine speed;
    means for directly or indirectly detecting a cylinder internal pressure generated in each combustion during the period; and
    means for correcting the retard amount based on the cylinder internal pressure during the period.

2. The control apparatus according to claim 1, further comprising:
    means for detecting an angular acceleration of a crank angle for each combustion during the period; and
    means for correcting the retard amount based on the angular acceleration during the period.

3. The control apparatus according to claim 1, further comprising:
    means for calculating a reference ignition timing; and
    means for updating the retard amount of the ignition timing according to the increase of the frequency of combustions.

4. The control apparatus according to claim 1, further comprising:
    means for calculating the reference ignition timing;
    means for updating the retard amount of the ignition timing according to the increase of number of times of combustions; and
    means for calculating the retard amount based on a combustion pressure or an angular acceleration.

5. The control apparatus according to claim 1, further comprising:
    means for calculating the reference ignition timing;
    means for updating the retard amount of the ignition timing according to the increase of the frequency of combustions; and
    means for stopping the retarding or returning the ignition timing to the reference value when the combustion pressure is equal to or smaller than a predetermined value A, or the angular acceleration is equal to or smaller than a predetermined value B.

6. The control apparatus according to claim 5, further comprising:
    means for determining the predetermined value A or B based on the number of times of combustions from at least one of a first combustion, an engine speed and a charging efficiency of air in a combustion chamber.

7. The control apparatus according to claim 5, further comprising:
    means for determining the updated retard amount based on the number of times of combustions from at least one of the first combustion, the engine speed, and the charging efficiency of air in the combustion chamber.

8. The control apparatus according to claim 1, further comprising:
    means for estimating a cylinder internal pressure from the detected angular acceleration.

9. The control apparatus according to claim 8, wherein said means for estimating a cylinder internal pressure from the angular acceleration further comprises means for correcting an inertia torque amount and/or friction torque amount of the engine.

10. The control apparatus according to claim 1, further comprising:
   means for directly or indirectly detecting a temperature in the combustion chamber or a temperature of a working gas; and
   means for permitting the retarding and/or means for calculating the retard amount based on the temperature in the combustion chamber or the temperature of the working gas.

11. The control apparatus according to claim 1, wherein the retarding is not performed in a first cycle but performed in and after a second cycle.

12. The control apparatus according to claim 1, wherein the means for retarding the ignition timing retards the ignition timing from an ATDC by at least 5 degrees, during the period of cranking at engine starting or during the period from the first combustion up to the idling engine speed.

13. The control apparatus according to claim 4, further comprising:
   means for estimating a fuel property based on the ignition timing or retard amount, and the combustion pressure or angular acceleration.

* * * * *